United States Patent
Itoi et al.

(10) Patent No.: US 8,147,305 B2
(45) Date of Patent: Apr. 3, 2012

(54) ATTACKING A VIRTUAL ENEMY BY CORRESPONDING INPUT TO OUTPUT SOUND

(75) Inventors: Shigesato Itoi, Tokyo (JP); Shogo Sakai, Tokyo (JP); Nobuyuki Inoue, Tokyo (JP); Masaki Aikyo, Tokyo (JP); Satoru Iwata, Kyoto (JP)

(73) Assignees: HAL Laboratory, Inc., Tokyo (JP); Nintendo Co., Ltd., Kyoto (JP)

( * ) Notice: Subject to any disclaimer, the term of this patent is extended or adjusted under 35 U.S.C. 154(b) by 869 days.

(21) Appl. No.: 10/829,393

(22) Filed: Apr. 22, 2004

(65) Prior Publication Data
US 2005/0014543 A1 Jan. 20, 2005

(30) Foreign Application Priority Data

Apr. 23, 2003 (JP) .................................. 2003-118135

(51) Int. Cl.
A63F 9/24 (2006.01)
A63F 13/00 (2006.01)
G06F 17/00 (2006.01)
G06F 19/00 (2006.01)

(52) U.S. Cl. .................. 463/8; 463/23; 463/30; 463/31; 463/35; 463/43

(58) Field of Classification Search ................ 463/8, 23, 463/30, 31, 35, 43
See application file for complete search history.

(56) References Cited

U.S. PATENT DOCUMENTS

| | | | | |
|---|---|---|---|---|
| 5,335,180 A | * | 8/1994 | Takahashi et al. | 701/117 |
| 5,592,609 A | * | 1/1997 | Suzuki et al. | 345/473 |
| 5,720,663 A | * | 2/1998 | Nakatani et al. | 463/23 |
| 6,117,014 A | * | 9/2000 | Aoyama et al. | 463/43 |
| 6,183,363 B1 | * | 2/2001 | Ishihara et al. | 463/31 |
| 6,231,440 B1 | * | 5/2001 | Yamashita | 463/7 |
| 6,273,814 B1 | * | 8/2001 | Komoto | 463/7 |
| 6,422,945 B1 | * | 7/2002 | Okita et al. | 463/49 |
| 6,439,998 B1 | * | 8/2002 | Itou | 463/43 |
| 2001/0049300 A1 | * | 12/2001 | Okamoto et al. | 463/30 |
| 2002/0045483 A1 | * | 4/2002 | Ito | 463/38 |

FOREIGN PATENT DOCUMENTS

JP 06-105959 4/1994

(Continued)

OTHER PUBLICATIONS

Surappu happii rizumu basutaazu (Slap Happy Rhythm Busters), Shuukan Famitsuu, Japan, Enterbrain, Inc., vol. 15 No. 28, p. 41 (Jul. 14, 2000).

(Continued)

*Primary Examiner* — David L. Lewis
*Assistant Examiner* — Adetokunbo Torimiro
(74) *Attorney, Agent, or Firm* — Nixon & Vanderhye PC

(57) ABSTRACT

A game apparatus includes a CPU, and the CPU executes a game process. When a player character encounters an enemy character in a game world, a battle screen is displayed on a monitor. On the battle screen, an input pattern is displayed, and background music (BGM) is output from a speaker. A player determines an operation timing based on the input pattern and the BGM (drum part). If there is a high level of coincidence between the operation timing by the player and a timing of the music pattern, damage which the player character applies to the enemy character and experienced obtained by the player character increases.

46 Claims, 14 Drawing Sheets

FOREIGN PATENT DOCUMENTS

| | | |
|---|---|---|
| JP | 11-179055 | 7/1999 |
| JP | 2002-200352 | 7/2002 |

OTHER PUBLICATIONS

Ragnarok Online Official Guide, Japan, Soft Bank Publishing Inc., third version, p. 96 ISBN:4-7973-2281-0 (Mar. 14, 2003).

Onimusha 2, Dengeki Playstation, Japan, Media Works Inc., vol. 8 No. 18, pp. 4-13 (Aug. 30, 2002).

Shadow Hearts, Dengeki Playstation, Japan, Media Works Inc., vol. 7 No. 18, pp. 48-51 (Jul. 13, 2001).

Hoshigami Shizumiyuku Aoki Daichi, Dengeki Playstation, Japan, Media Works Inc., vol. 7 No. 5, pp. 34-39 (Feb. 9, 2001).

Dorimaga Books Phantasy Star Online Ultimate, Japan, Soft Bank Publishing Inc., first version, p. 41, ISBN:4-7973-1873-2 (Jul. 8, 2002).

Playstation 2 Kanzen Kouryaku (Perfect Capture?) Series 3, tsugunai official capture guide, Japan, Futabasha Publishers Ltd., First version, p. 11, ISBN: 4-575-16252-3 (Mar. 10, 2001).

Playstation Kanpeki Kouryaku (Complete Capture) Series 53 Sentoukokka-improved Hisshou Kouryku How, Japan, Futabasha Publishers Ltd., First version, p. 9, ISBN:4-575-16050-4 (Jun. 1, 1997).

Arcadia, Japan, Enterbrain, Inc., vol. 4 No. 1, pp. 58-59 (Jan. 1, 2003).

Tokyo Majin Gakuen Gaihochou, Dengeki Playstation, Japan, Media Works Inc., vol. 7 No. 26, pp. 8-11 (Oct. 12, 2001).

Sega Saturnversion Meltylancer Reinforce—Official Guide, Japan, Soft Bank Corp. Publishing, First version, p. 24, ISBN:4-7973-0646-7 (May 31, 1998).

* cited by examiner

FIG. 4

CHARACTER ATTRIBUTE
(PARAMETER)

| CHARACTER NAME | HP (MAX) | EXPERIENCED VALUE |
|---|---|---|
| PLAYER CHARACTER | 20 (20) | 322 |
| ENEMY CHARACTER A | 30~40 | 15~20 |
| ENEMY CHARACTER B | 30~40 | 40~50 |
| ⋮ | ⋮ | ⋮ |

FIG. 5

OPERATION TIMING PATTERN

| CHARACTER NAME | PATTERN | RHYTHM PATTERN (DRUM PART) | TIMING FRAME NUMBER | MUSIC INFORMATION |
|---|---|---|---|---|
| ENEMY CHARACTER A | PATTERN 1 | | $\frac{1}{120}, \frac{61}{120}$ | BGM 1 |
| ENEMY CHARACTER B | PATTERN 2 | | $\frac{1}{120}, \frac{31}{120}, \frac{61}{120}, \frac{76}{120}, \frac{91}{120}$ | BGM 2 |
| ... | ... | ... | ... | ... |

♩ ... QUARTER NOTE
♪ ... EIGHTH NOTE
𝄽 ... REST (A) GAME SCREEN 70

(B) BATTLE SCREEN 80

(A) SMALL AND LARGE OF DAMAGE DEPENDING ON OPERATION TIMING (B) REDUCED VALUE DEPENDING ON OPERATION TIMING

IN A CASE A DEGREE OF COINCIDENCE IS SUCCESSIVELY HIGH, +5~+10

OPERATION TIMING PATTERN

| CHARACTER NAME | PATTERN | RHYTHM PATTERN (DRUM PART) | TIMING FRAME NUMBER | MUSIC INFORMATION |
|---|---|---|---|---|
| PLAYER CHARACTER A | PATTERN 1 | | $\frac{1}{120}, \frac{61}{120}$ | BGM 1 |
| PLAYER CHARACTER B | PATTERN 2 | | $\frac{1}{120}, \frac{31}{120}, \frac{61}{120}, \frac{76}{120}, \frac{91}{120}$ | BGM 2 |
| ... | ... | ... | ... | ... |

♩ ··· QUARTER NOTE
♪ ··· EIGHTH NOTE
𝄽 ··· REST

ATTACKING A VIRTUAL ENEMY BY CORRESPONDING INPUT TO OUTPUT SOUND

STATEMENT REGARDING FEDERALLY SPONSORED RESEARCH OR DEVELOPMENT

Not applicable.

CROSS-REFERENCE TO RELATED APPLICATIONS

This application claims priority to Japanese Application No. 2003-118135, filed Apr. 23, 2003, the entire contents of which are hereby incorporated by reference.

FIELD

The technology herein relates to a game apparatus, a game program and a game method. More specifically, the technology herein relates to a game apparatus, a game program and a game method for displaying a battle scene in which characters in a game world fight with each other.

BACKGROUND AND SUMMARY

An example of this kind of a conventional game apparatus is disclosed in Japanese-patent No. 2794230 registered on Jun. 26, 1998. In such a conventional video game apparatus, offensive turns are alternately changed between a player character and an enemy character. In the offensive turn of the player character, the player character attacks the enemy character by selecting a specific command. In the enemy character offensive turn, an attack is made on the player character depending upon the kind of enemy character. For example, when a player character attacks the enemy character, a hit point of the enemy character is reduced depending on the attack, and when the HP becomes 0, the enemy character disappears from a screen.

Another example of this kind of a conventional game apparatus is disclosed in a Japanese Patent Laying-open No. 11-179055 laid-open on Jul. 6, 1999. In such conventional game apparatus, an offensive power of the player's own character is represented by a bar graph of ATB bar. For example, when the enemy character enters a firing range of attack of his own character, a display of the ATB bar is started, that is, the bar graph gradually extends from 0. The bar graph has a length in proportion to a lapsed time from an ATB bar display starting time, but doesn't extend when it reaches an upper limit. When the player instructs his own character to attack, an attack is made on the enemy character with offensive power in proportion to the length of the bar graph displayed by the ATB bar.

However, in the former case, the attack to the enemy character is to apply the hit point set in advance by the selected command or to apply the hit point obtained by multiplying the hit point by a ratio determined by use of a random number, and a player's attacking ability (skill) is not reflected on the offensive power. This operation limits the entertainment and interest aspects of the game.

Furthermore, in the latter case, the offensive power depending on the length of the bar graph displayed on the ATB bar is merely applied to the enemy character. This operation also limits the entertainment and interest aspects of the game.

Therefore, it is a primary feature of the presently preferred exemplary non-limiting implementation to provide a novel game apparatus, game program and game method.

Furthermore, another feature of the illustrative implementations is to provide a unique game apparatus, unique game program and unique game method operable to reflect a player's ability on a game.

A game apparatus according to the illustrative implementations displays a battle scene in which characters in a game world fight with each other, comprising: first storage locations for storing a parameter for each character appearing in the game world; second storage locations for storing an operation timing pattern showing a player timings to be operated in association with each character; an instruction image changing mechanism for displaying, when the battle scene is displayed, an instruction image and changing a displaying manner of the instruction image on the basis of the operation timing pattern associated with the character appearing in the battle scene stored in the second storage locations; an operation detecting mechanism for detecting an operation by the player input in response to a change of the instruction image; a changing value calculating mechanism for calculating a changing value for changing the parameter of the character depending upon a degree of coincidence between the operation timing of the player at a time of being detected by the operation detecting mechanism and the timing of the operation timing pattern; and a parameter updating mechanism for updating the parameter of the character being appearing in the battle scene on the basis of the changing value calculated by the changing value calculating mechanism.

More specifically, the game apparatus (12: a reference numeral corresponding in "the detailed description of the preferred implementations" described later, and so forth) displays the game world in which the characters in the game world fight with each other. The first storage locations (40) store the parameter for each character appearing in the game world, and the second storage locations (40) store the operation timing pattern showing a player timings to be operated in association with each character (72, 74). When the battle scene (80) is displayed, the instruction image changing mechanism (36, S11) displays the instruction image (78) and changes the displaying manner of the instruction image (78) on the basis of the operation timing pattern associated with the character (72, 74) appearing in the battle scene (80) stored in the second storage locations (40). By watching the instruction image (78), the player weights the timing of the operation (attack). The operation by the player is detected by the operation detecting mechanism (36, S53). Thereupon, the changing value calculating mechanism (36, S77) calculates the changing value for changing the parameter of the character (72, 74) depending upon the degree of coincidence between the operation timing of the player at a time of being detected and the timing of the operation timing pattern. Then, the parameter updating mechanism (36, S15, S21) updates the parameter of the character (72, 74) being appearing in the battle scene (80) on the basis of the calculated changing value.

According to the illustrative implementations, the parameter of the character can be changed depending upon the operation timing by the player, and therefore, it is possible to reflect an operation ability of the player on the content of the game.

In one exemplary non-limiting implementation, the second storage locations store for each character the operation timing patterns having different difficulty levels of the operation for the player, and the instruction image changing mechanism changes the displaying manner of the instruction image on the basis of the operation timing pattern associated with any one of an offensive character and a defensive character. More specifically, the second storage locations (40) store for each character (72, 74) the operation timing pattern having different difficulty levels of the operation for the player, and the instruction image changing mechanism (36, S11) changes the displaying manner of the instruction image on the basis of the operation timing pattern associated with any one of the offensive character (72) and the defensive character (74).

In a case of changing the displaying manner of the instruction image on the basis of the operation timing pattern associated with the offensive character, a complex (difficult) operation timing pattern can be associated with a character having a strong offensive power while a simple (easy) operation timing pattern can be associated with a character having a weak offensive power. That is, small and large offensive power can be determined by the operation ability (skill) of the player, and it is possible to give an enhanced sense of accomplishment to the player.

In a case of changing the displaying manner of the instruction image on the basis of the operation timing pattern associated with the defensive character, a complex (difficult) operation timing pattern can be associated with a strong character while a simple (easy) operation timing pattern can be associated with a weak character. That is, whether or not to defeat the character depends on the operation ability (skill).

In one aspect of the illustrative implementations, the parameter includes a physical strength parameter on which a battle continuing ability of the character depends, and the parameter updating mechanism reduces the physical strength parameter of a defensive character such that the defensive character being appearing in the battle scene is damaged on the basis of the changing value calculated by the changing value calculating mechanism. More specifically, the parameter, for example, includes the physical strength parameter on which the battle continuing ability of the character depends. The parameter updating mechanism (36, S15) reduces the physical strength parameter of the defensive character (74) such that the defensive character (74) being appearing in the battle scene is damaged on the basis of the changing value calculated by the changing value calculating mechanism (36, S77). The changing value is calculated depending upon the operation timing of the player and reflects on the physical strength parameter of the defensive character (74). Thus, an effect of attacking is changeable depending upon the operation ability of the player, and whereby, an entertainment aspect of the game can be improved.

In another one of the illustrative implementations, the instruction image changing mechanism changes the displaying manner by displaying the instruction image in a rhythmic manner, an enlarged/reduced manner, or a displayed/non-displayed manner on the basis of the operation timing pattern associated with the character appearing in the battle scene. More specifically, the instruction image changing mechanism (36, S11) changes the displaying manner by displaying the instruction image (78) in a rhythmic manner, an enlarged/reduced manner, or a displayed/non-displayed manner on the basis of the operation timing pattern associated with the character (72, 74) appearing in the battle scene (80). That is, the displaying manner of the instruction image (78) is changed according to a predetermined rhythm and therefore, a rhythmic attack can cause an effective damage.

In another non-limiting embodiment, the instruction image changing mechanism changes at least one of a color and a shape of the instruction image at the timing that has to be operated by the player on the basis of the operation timing pattern. More specifically, the instruction image changing mechanism (36, S41) changes at least one of the color and the shape of the instruction image (78) at the timing that has to be operated by the player on the basis of the operation timing pattern, and therefore, if the player watches the instruction image (78), a timing to be operated (attacked) can be easily weighted.

In another aspect of the illustrative implementations, a music reproducing mechanism for reproducing music data for playing a background music (BGM) in the battle scene is further provided, wherein the second storage locations store the music data which is utilized as the operation timing pattern and is constituted of a plurality of kinds of parts each being a reproduction object by the music reproducing mechanism, and the instruction image changing mechanism changes the displaying manner of the instruction image on the basis of any one of the parts constituting the music data when the BGM is being played by the music reproducing mechanism. More specifically, the game apparatus (12) is provided with the music reproducing mechanism (34a, 36, 62, S119) for reproducing the music data for playing a BGM in the battle scene (80). The second storage locations (40) store the music data (sound data) which is utilized as the operation timing pattern and is constituted of the plurality of kinds of parts each being the reproduction object by the music reproducing mechanism (34a, 36, 62, S119). The instruction image changing mechanism (36, S41) changes the displaying manner of the instruction image (78) on the basis of any one of the parts constituting the music data, e.g., the drum part when the BGM is being played by the music reproducing mechanism (34a, 36, 62, S119). That is, the player can weight the timing of an operation with ease not only by watching the instruction image but also by listening to the drum part of the BGM.

In the other aspect of the illustrative implementations, the parameter includes an ability parameter on which a superiority of a fighting capability of the character depends, and the parameter updating mechanism updates the ability parameter of the character to be operated by the player on the basis of the changing value calculated by the changing value calculating mechanism when the battle is ended. More specifically, the parameter includes the ability parameter on which the superiority of the fighting capability (level) of the character (72, 74) depends. The parameter updating mechanism (36, S21) updates the ability parameter of the character (72) to be operated by the player on the basis of the changing value calculated by the changing value calculating mechanism (36, S77) when the battle is ended. That is, since the ability parameter of the character (72) to be operated by the player is increased on the basis of the changing value calculated depending upon the operation timing, it is possible to change a degree of a level improvement of the player character in accordance with the operation ability of the player. Therefore, it is possible to improve an entertainment aspect of the game.

In one exemplary non-limiting implementation, the changing value calculating mechanism calculates the changing value so as to largely change the parameter of the character as a degree of coincidence between the operation timing of the player at a time of being detected by the operation detecting mechanism and the timing of the operation timing pattern corresponding to the timing is higher. More specifically, the changing value calculating mechanism (36, S77) calculates the changing value so as to largely change the parameter of the character (72, 74) as the degree of coincidence between the operation timing of the player at a time of being detected by the operation detecting mechanism and the timing of the operation timing pattern corresponding to the timing is higher. Specifically, the ability parameter of the offensive character is largely increased while the physical strength parameter of the defensive character is largely reduced. That is, the player can perform an accurate operation as a degree of learning of the game is higher, and can reflect his or her operation on the content of the game.

In another exemplary implementation, the operation timing pattern is constructed so as to be successively operated at a plurality of timings by the player, and the changing value calculating mechanism calculates, every time that the operation by the player is detected by the operation detecting mechanism, the changing value depending upon a degree of coincidence between the operation timing by the player at that time and the timing of the operation timing pattern corresponding to the time. More specifically, the operation timing pattern is constructed so as to be successively operated at the plurality of timings by the player, and the changing value calculating mechanism (36, S77) calculates the changing value depending upon the degree of coincidence between the operation timing and the timing of the operation timing pattern every time. That is, the offensive character can attack at a plurality of times per one offensive turn, and apply a damage thus accumulated to the defensive character so as to reduce the physical strength parameter of the defensive character. Furthermore, the ability parameter can be increased depending upon the accumulated damage. Thus, it is possible to enjoy development of the game depending upon the operation ability of the player.

In an exemplary implementation, the changing value calculating mechanism calculates the changing value so as to be gradually increased when the degree of coincidence between the operation timing of the player detected by the operation detecting mechanism and the timing of the operation timing pattern is successively high. More specifically, the changing value calculating mechanism (36, S77) calculates the changing value so as to be gradually (nonlinearly) increased when the degree of coincidence between the operation timing and the timing of the operation timing pattern is successively higher. That is, the higher the operation ability of the player is, the greater is the damage to be applied to the character.

In another implementation, the battle scene is for fighting the characters with each other by alternately repeating an offensive turn and a defensive turn, further comprising a turn changing mechanism for allowing successive operations by the player until the degree of coincidence does not become lower than a predetermined value and making a change between the offensive turn and the defensive turn at a time that the degree of coincidence becomes lower than the predetermined value. More specifically, the battle scene (80) is for fighting the characters with each other by alternately repeating the offensive turn and the defensive turn. The turn changing mechanism (36, S19) allows the successive operations by the player until the degree of coincidence does not become lower than the predetermined value and makes the change between the offensive turn and the defensive turn at a time that the degree of coincidence become lower than the predetermined value. For example, in a case the degree of coincidence becomes lower than the predetermined value due to failing in the attack, the offensive turn and defensive turn is changed; however, during succeeding in the attack, the successive attacks can be made. That is, it is possible to make an attack depending upon the operation ability of the player.

In another aspect of the illustrative implementations, third storage locations for storing the number of operable times information indicative of the number of operable times by the player; a number of times reducing mechanism for reducing the number of operable times depending upon an operation of the player; and an operation ending mechanism for ending the operation by the player when the number of operable times becomes 0 are further provided. More specifically, the third storage locations (40) store the number of operable times information indicative of the number of attackable (operable) times per one offensive turn. The number of times reducing mechanism (36, S79) reduces the number of operable times depending upon the operation of the player. Then, the operation ending mechanism (36, S81) ends the operation by the player, i.e., offensive turn when the number of operable times becomes 0. That is, the number of operable (attacking) times can be restricted.

In implementation, a number of times increasing mechanism for increasing the number of operable times when the degree of coincidence between the operation timing of the player and the timing of the operation timing pattern is successively high is further provided. More specifically, the number of times increasing mechanism (36, S73) increases the number of operable times when the degree of the coincidence between the operation timing of the player and the timing of the operation timing pattern is successively high. A player superior in the operation ability can make more attacks per one offensive turn. Thus, it is possible to increase a sense of accomplishment.

A game program according to the illustrative implementations is executed by a computer of a game apparatus in order to display a battle scene in which characters in a game world fight with each other. The game program works the computer as following mechanism: first storage locations for storing a parameter for each character appearing in the game world; second storage locations for storing an operation timing pattern showing to a player timings to be operated in association with each character; an instruction image changing mechanism for displaying, when the battle scene is displayed, an instruction image and changing a displaying manner of the instruction image on the basis of the operation timing pattern associated with the character appearing in the battle scene stored in the second storage locations; an operation detecting mechanism for detecting an operation by the player input in response to a change of the instruction image; a changing value calculating mechanism for calculating a changing value for changing the parameter of the character depending upon a degree of coincidence between the operation timing of the player at a time of being detected by the operation detecting mechanism and the timing of the operation timing pattern; and a parameter updating mechanism for updating the parameter of the character being appearing in the battle scene on the basis of the changing value calculated by the changing value calculating mechanism.

In the game program of the illustrative implementations also, it is possible to reflect the operation ability of the player on the content of the game similarly to the above-described game apparatus.

A game method according to the illustrative implementations is a game method of a game apparatus which displays a battle scene in which characters in a game world fight with each other and has first storage locations for storing a parameter for each character appearing in the game world and second storage locations for storing an operation timing pattern showing to a player timings to be operated in associated with each character, comprising following steps of: (a) displaying, when the battle scene is displayed, an instruction image and changing a displaying manner of the instruction image on the basis of the operation timing pattern associated with the character appearing in the battle scene stored in the second storage locations; (b) detecting mechanism for detecting an operation by the player input in response to a change of the instruction image; (c) calculating a changing value for changing the parameter of the character depending upon a degree of coincidence between the operation timing of the player at a time of being detected in a step (b) and the timing of the operation timing pattern; and (d) updating the parameter of the character being appearing in the battle scene on the basis of the changing value calculated in the step (c).

In the game method of the illustrative implementations also, it is possible to reflect the operation ability of the player on the content of the game similarly to the above-described game apparatus.

Another game apparatus according to the illustrative implementations displays a battle scene in which characters in a game world fight with each other, comprising: first storage locations for storing a parameter for each character appearing in the game world; second storage locations for storing in association with said each character a background music that renders an operation timing pattern presenting to a player timings to be operated a rhythm pattern; a BGM reproducing mechanism for reproducing a background music associated with the character being appearing in the battle scene stored in the second storage locations; an operation detecting mechanism for detecting an operation by the player input after the background music starts to be reproduced; a changing value calculating mechanism for calculating a changing value for changing the parameter of the character depending upon a degree of coincidence between the operation timing of the player at a time of being detected by the operation detecting mechanism and the timing of the rhythm pattern of the background music corresponding to that time; a parameter updating mechanism for updating the parameter of the character being appearing in the battle scene on the basis of the changing value calculated by the changing value calculating mechanism.

It is also possible for the player to weigh the operation timing by reproducing the BGM including the rhythm pattern as the operation timing without displaying the instruction image. Furthermore, the parameter of the character can be changed depending on the operation timing by the player. Therefore, it is possible to reflect the operation ability of the player on the content of the game as in the above-described game apparatus.

The above described objects and other objects, features, aspects and advantages of the illustrative implementations will become more apparent from the following detailed description of a presently preferred exemplary non-limiting when taken in conjunction with the accompanying drawings.

BRIEF DESCRIPTION OF THE DRAWINGS

These and other features and advantages will be better and more completely understood by referring to the following detailed description of exemplary non-limiting illustrative implementations in conjunction with the drawings of which:

FIG. 4 is an illustrative view showing a content of parameter data shown in FIG. 3;

FIG. 5 is an illustrative view showing a content of operation timing pattern data shown in FIG. 3;

DETAILED DESCRIPTION

Figure 1:
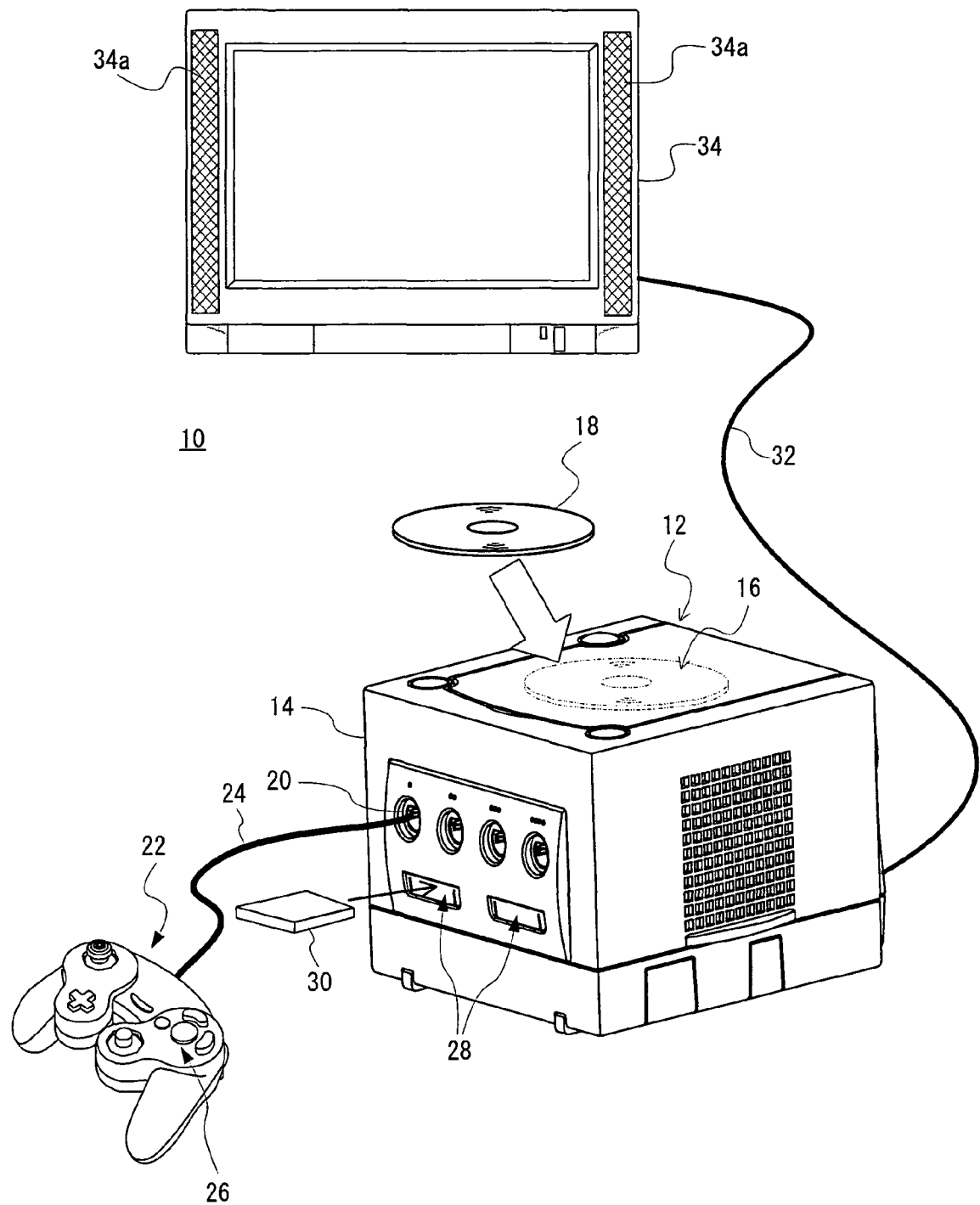
FIG. 1 is an illustrative view showing one example of a game system of a presently preferred non-limiting exemplary implementation.

Referring to FIG. 1, a video game system 10 of this non-limiting exemplary implementation includes a video game apparatus 12. Although a power source is applied to the video game apparatus 12, a general AC adapter (not shown) may be applied thereto in this implementation. The AC adapter is inserted into a standard wall socket for home use, and a power source for home use is converted to a low DC voltage signal suitable for driving the video game apparatus 12. In another non-limiting exemplary implementation, a battery may be utilized as the power source.

The video game apparatus 12 includes an approximately cubic housing 14, and the housing 14 is provided with an optical disk drive 16 on an upper edge thereof. An optical disk 18 which is one example of an information storage medium storing at least a game program, graphics data, and sound data is loaded on the optical disk drive 16. The housing 14 is provided with a plurality of connectors 20 (four in this implementation) on a front surface thereof. These connectors 20 are for connecting a controller 22 to the video game apparatus 12 by a cable 24 integrated into the controller 22 and can connect up to four controllers to the video game apparatus 12 in this implementation.

The controller 22 is provided with an operating mechanism (control) 26 on upper, lower, lateral sides, etc. thereof. The operating mechanism 26, for example, includes two analog joysticks, one cross switch, a plurality of button switches and so on. One analog joystick is utilized for inputting a moving direction and/or a moving speed, moving amount and etc. of a player character (a moving image character operable by the controller 22 by the player) according to an amount and a direction of an inclination of the stick. Other analog joystick is utilized for controlling a movement of the virtual camera according to a direction of an inclination thereof. The cross switch is utilized for instructing a moving direction of the player character in place of the analog joystick. The button switches are utilized for instructing a movement of the player character, switching a point of view of the virtual camera in the three-dimension image, adjusting the moving speed of the player character and etc. The button switches, for example, further control a menu selection and a movement of a pointer or a cursor.

It is noted that the controller 22 is connected to the video game apparatus 12 by the cable 24 integrated into the controller 22 in this implementation. However, the controller 22 may be connected to the video game apparatus 12 by another method such as a wireless manner via an electromagnetic wave (e.g., radio wave or infrared ray). Furthermore, detailed structure of the operating mechanism 26 of the controller 22 is, of course, not limited to the structure of the implementation and can be arbitrarily changed or modified. For example, the only one analog joystick may be utilized or no analog joystick may be utilized. The cross switch may not be utilized.

At least one (two in this implementation) memory slot 28 is provided below the connectors 20 on the front surface of the housing 14 of the video game apparatus 12. A memory card 30 is inserted to this memory slot 28. The memory card 30 is utilized for loading the game program and etc. read from the optical disk 18 so as to temporarily store, or saving game data (e.g., result of a game) of the game that the player plays by utilizing the game system 10.

The housing 14 of the video game apparatus 12 is, on a rear surface thereof, provided with an AV cable connector (not shown) with which a monitor 34 is connected to the video game apparatus 12 through an AV cable 32. The monitor 34 is typically a color television receiver, and the AV cable 32 inputs a video signal from the video game apparatus 12 to a video input terminal of the color television and applies a sound signal to a sound input terminal. Accordingly, a game image of a three-dimension (3D) video game, for example, is displayed on the color television (monitor) 34, and a game sound (stereo game sound) such as a game music, a sound effect and etc. is output from right and left speakers 34*a*.

In the game system 10, a user or a game player first turns on an electric power source of the game apparatus 12 in order to play a game (or another application), and then selects a suitable optical disk 18 storing a video game (or another application intended to play), and loads the optical disk 18 on the disk drive 16 of the video game apparatus 12. In response thereto, the game apparatus 12 starts to execute the video game or another application on the basis of software stored in the optical disk 18. The player operates the controller 22 so as to apply an input to the game apparatus 12. For example, the player starts the game or another application by operating any one of the operating mechanism 26. By moving another of the operating mechanism 26, it is possible to move the moving image character (player character) toward different directions and to change the point of eye of the user (camera location) in the three-dimensional (3D) game playing virtual space (hereinafter referred to as "game world").

Figure 2:
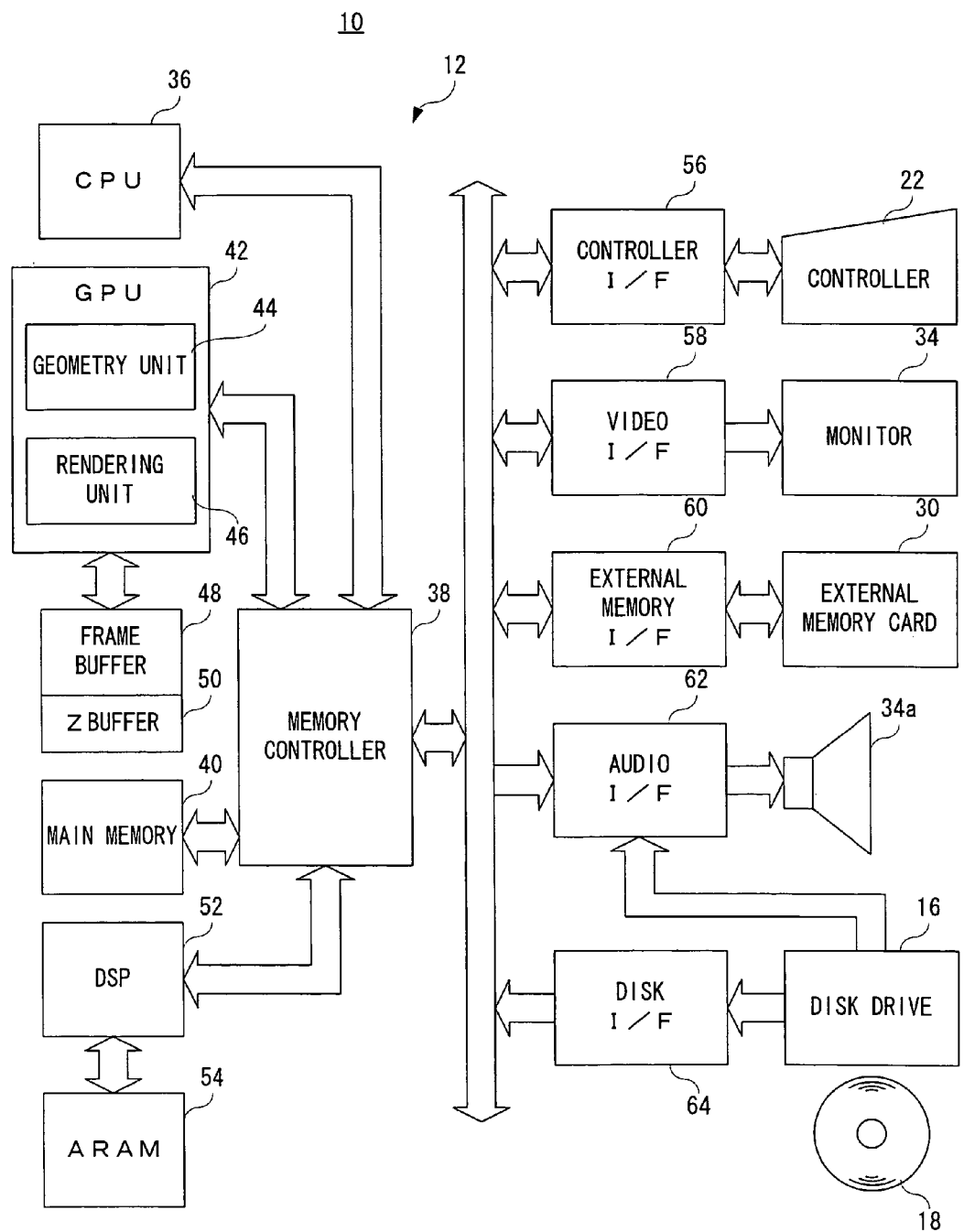
FIG. 2 is a block diagram showing a electric configuration of a video game apparatus shown in FIG. 1 implementation.

FIG. 2 is a block diagram showing an electrical structure of the video game system 10 of FIG. 1 implementation. The video game apparatus 12 is provided with a central processing unit (hereinafter, may be referred to as "CPU") 36. The CPU 36 is called a computer or a processor and is in charge of governing overall control of the video game apparatus 12. The CPU 36 functions as a game processor and is connected with a memory controller 38 via a bus. The memory controller 38 mainly controls writing and reading of a main memory 40 connected via a bus under control of the CPU 36. The memory controller 38 is coupled with a GPU (Graphics Processing Unit) 42.

The GPU 42 forms a part of a rendering mechanism, is constructed by a single chip ASIC, for example, and receives a graphics command (a construction command) from the CPU 36 via the memory controller 38 and then, in response to the command, generates the three-dimension (3D) game image by a geometry unit 44 and a rendering unit 46. Specifically, the geometry unit 44 performs a coordinate operation process such as turn-around or rotation, movement, transformation and etc. of a variety of characters and objects (which is formed by a plurality of polygons, and the polygon is a polygonal plane defined by at least three vertex coordinates) in a three-dimension coordinates system. The rendering unit 46 pastes performs an image generating process such as pasting a texture on each of polygons of the variety of objects and so on. Accordingly, three-dimension image data to be displayed on the game screen is produced by the GPU 42, and the image data is rendered (stored) in the frame buffer 48.

It is noted that data (primitive or polygon, texture and etc.) desired to execute the construction command by the GPU 42 is acquired from the main memory 40 via the memory controller 38.

The frame buffer 48 is a memory for rendering (storing) the image data of one frame of the raster scan monitor 34, for example, and is rewritten by the GPU 42 every one frame. A video I/F 58 described later reads the data stored in the frame buffer 48 via the memory controller 38 and the GPU 42, and whereby the 3D game image is displayed on the screen of the monitor 34.

Furthermore, a Z buffer 50 has a storage capacity equal to the number of pixels (storing positions or addresses) corresponding to the frame buffer 48 xthe number of bits of depth data per one pixel, and store depth information or depth data (Z value) of dots corresponding to respective storing positions of the frame buffer 48.

It is noted that the frame buffer 48 and the Z buffer 50 may be constructed by utilizing a portion of the main memory 40.

The memory controller 38 is also connected to an ARAM 54 via a DSP (Digital Signal Processor) 52. Accordingly, the memory controller 38 controls the writing and/or the reading of the ARAM 54 as a sub memory in addition to the main memory 40.

The DSP 52 functions as a sound processor and generates audio data corresponding to a sound required for the game, a music or sound by use of the sound data (see FIG. 3) stored in the main memory 40 and by use of sound wave form data written to the ARAM 54.

The memory controller 38 is further connected to respective interfaces (I/F) 56, 58, 60, 62 and 64 by buses. The controller I/F 56 is an interface for the controller 22 and applies an operation signal or data of the operating mechanism 26 to the CPU 36 through the memory controller 38. The video I/F 58 accesses the frame buffer 48 to read the image data formed by the GPU 42 and then, applies the image signal or the image data (digital RGB pixel values) to the monitor 34 via the AV cable 32 (FIG. 1).

The external memory I/F 60 makes the memory card 30 (FIG. 1) which is inserted to the front surface of the video game apparatus 12 communicate to the memory controller 38. This allows the CPU 36 to write and read the data to and from the memory card 30 (FIG. 1) via the memory controller 38. The audio I/F 62 receives audio data applied from the DSP 52 through the memory controller 38 or an audio stream read from the optical disk 18, and then applies an audio signal (sound signal) corresponding thereto to the speakers 34*a* of the monitor 34.

The disk I/F 64 connects the disk drive 16 to the memory controller 38, and whereby the CPU 36 controls the disk drive 16. The disk drive 16 writes program the data, the texture data and etc. read from the optical disk 18 to the main memory 40 under control of the CPU 36.

Figure 3:
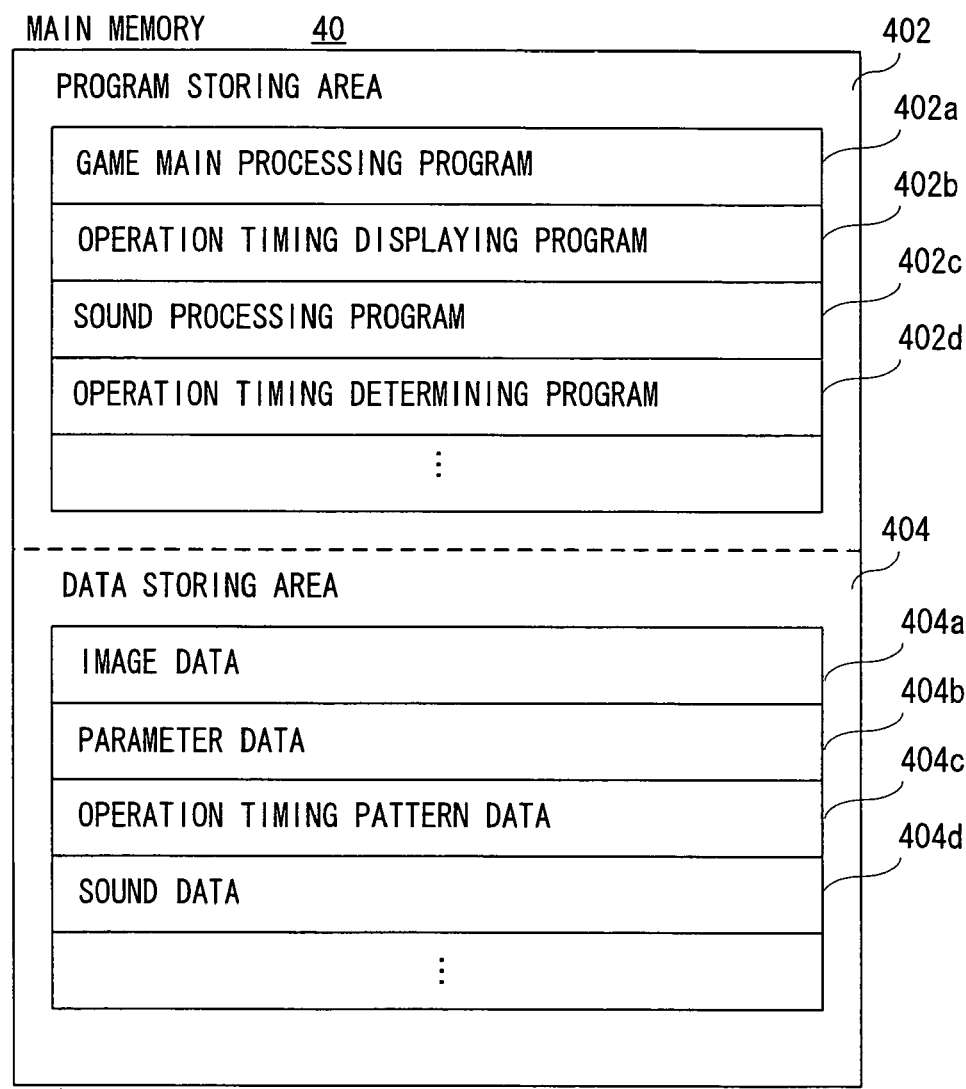
FIG. 3 is an illustrative view showing a memory map of a main memory shown in FIG. 2.

FIG. 3 shows a memory map of the main memory 40. The main memory 40, for example, is constituted of a program storing area 402 and a data storing area 404. The program storing area 402 is stored with a game program read from the optical disk 18 entirely at a time or partially and sequentially. The game program is constituted of a game main processing program 402a, an operation timing displaying program 402b, a sound processing program 402c, an operation timing determining program 402d and etc.

It is noted that a description as to processing according to these programs is made later by use of a flowchart (see FIG. 11 to FIG. 14) in detail.

Furthermore, the data storing area 404 is stored with data read from the optical disk 18 at a time or partially and sequentially, and temporarily stored with game data generated as the game progresses. As such the data, image data 404a, parameter data 404b, operation timing pattern data 404c, sound data 404d and etc. are stored in this implementation.

The image data 404a includes image data such as a polygon related to a plurality of characters and image data of a game world (including battle screen). Herein, the character mechanism a player character, a non-player character, an item character or a background object (character) such as a wall object, a land object and etc. The player character is a character who can be moved in a desired direction or can be subjected to a desired movement by the player, and the non-player character is a character such as an enemy character who can be moved in a direction set by the program or can be subjected to a movement set by the program independent of an operation of the controller by the player. Furthermore, the item character is a character of an item (e.g., food, money, medicine and arms) which is obtained or acquired by the player character during the game.

The parameter data 404b is numerical data as to a hit point (HP) and an experienced value of the player character and the enemy character (non-player character). As shown in FIG. 4, the parameter data 404b is data of a table in which a numerical value or a range of the numerical values of each of the HP and the experienced value are described for each character.

Herein, the HP is a physical strength parameter on which a battle continuing ability of the character depends, i.e., lives of the player character and the enemy character. As to the player character, a numerical value on the left side is the numerical value of a current life and is updated every time that a battle against the enemy character is finished. It is noted that there is a case that by obtaining and using a specific item, the current life may be increased. Furthermore, a numerical value inside the parentheses is a maximum value (MAX) of the life and changeable according to the experienced value described later. On the other hand, as to the enemy character, the life is indicated by a range of the numerical values. For example, the numerical value of the life of the enemy character is, every time that a battle is made, set (determined) within the range according to a random number and a level (experienced value) of the player character.

Furthermore, the experienced value is an ability parameter for determining superiority in a fighting capability of the characters, and as to the player character, the value is increased by defeating the enemy character, obtaining a specific item, and so forth. In addition, as to the enemy character, the value is shown as a range of the experienced values to be applied to the player character in a case of being defeated by the player character. For example, the experienced value obtained by defeating the enemy character by the player character is, as a rule, set (determined) within the range of the numerical values in correspondence to the enemy character every time that the battle is made. It is noted that in some cases, the experienced value is determined so as to take a value out of the range. A determination method thereof is described later in detail and hence omitted herein.

The operation timing pattern data 404c is determined in correspondence to each enemy character in this implementation and is data as to operation timing patterns having different difficulty levels of the operation for the player. The detailed content is shown in FIG. 5, and the operation timing patterns are assigned to the respective enemy characters A, B, . . . . In the operation timing pattern, a rhythm pattern, a frame number of the operation timing (timing frame number) and music information are described for each kind (pattern 1, pattern 2, . . . ).

Herein, the "different difficulty levels of the operation" means a degree of difficulty of an operation by the player, i.e., means that regularity or irregularity of the operation timing patterns corresponding to the respective enemy characters are different. For example, for one enemy character, the rhythm pattern is formed by only triple time, for the other enemy character, the rhythm pattern is formed by only double time, and for another enemy character, the rhythm pattern is formed such that the triple time and the double time are mixed with each other. That is, the timings to be operated or a speed of the operation defined (designated) by the rhythm pattern, or the both thereof are different.

The rhythm pattern corresponds to a drum part at a time of playing the music (BGM 1, BGM2, . . . ). It is noted that it is not necessary to be limited thereto, and it may be applied to a part of another musical instruments. A screen-displaying of a character (instruction image) for instructing an operation timing (attacking timing) of the player is executed according to the rhythm pattern (see FIG. 7 and FIG. 8).

Furthermore, the timing frame number is a start timing of a sound played by the drum part and a timing for changing a displaying manner (position, size, movement, color and etc.) of the instruction image in order to indicate an optimal operation timing described later.

In addition, the music information is a music name or identifying information of the music (BGM) output (played) from the speakers 34a in a scene (battle scene) in which the player character fights against the encountered enemy character. The BGM is a music formed by one or plurality of parts (musical instruments and etc.), and the sound data of the BGM 404d is stored in the data storing area 404 of the main memory 40 described later.

For example, as to an enemy character A, the operation timing pattern is a pattern 1, and the rhythm pattern is one measure formed by "a quarter note, a rest, a quarter note and a rest", and the rhythm is repeated. Furthermore, assuming that one measure is 120 frames, the timing frame number is 1/120 and 61/120. Then, the music information is a BGM1.

In addition, as to an enemy character B, the operation timing pattern is a pattern 2, and the rhythm pattern is one measure formed by "a quarter note, a quarter note, a eighth note, a eighth note and a quarter note", and the rhythm is repeated. Furthermore, assuming that one measure is 120 frames, the timing frame number is 1/120, 31/120, 61/120, 76/120 and 91/120. Then, the music information is a BGM2.

Thus, the different operation timing patterns are assigned corresponding to the enemy characters; however, the number (kind) of the enemy characters is enormous, and therefore, there is a case that the same pattern is set to the different kinds of enemy characters. For example, the same pattern is set to the enemy character having the experienced value of the same level.

The sound data 404d is sound (music) data such as a sound required for the game (sound effect), music (BGM), a sound (sounds of characters) and etc.

When a game process is executed by a game program written to the main memory 40, for example, by alternately repeating an offensive turn and defensive turn between the player character and the enemy character, it is possible to play a game in which the characters fight with each other.

Figure 6:
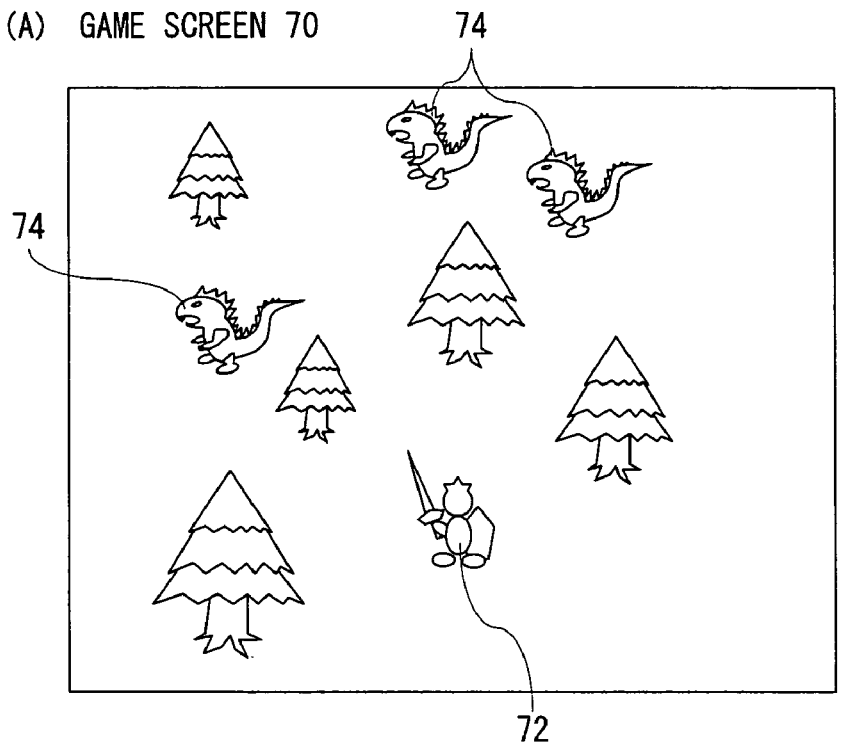
FIG. 6 is an illustrative view showing one example of a game screen (battle screen) displayed on a monitor shown in FIG. 1 implementation.
Figure 6:
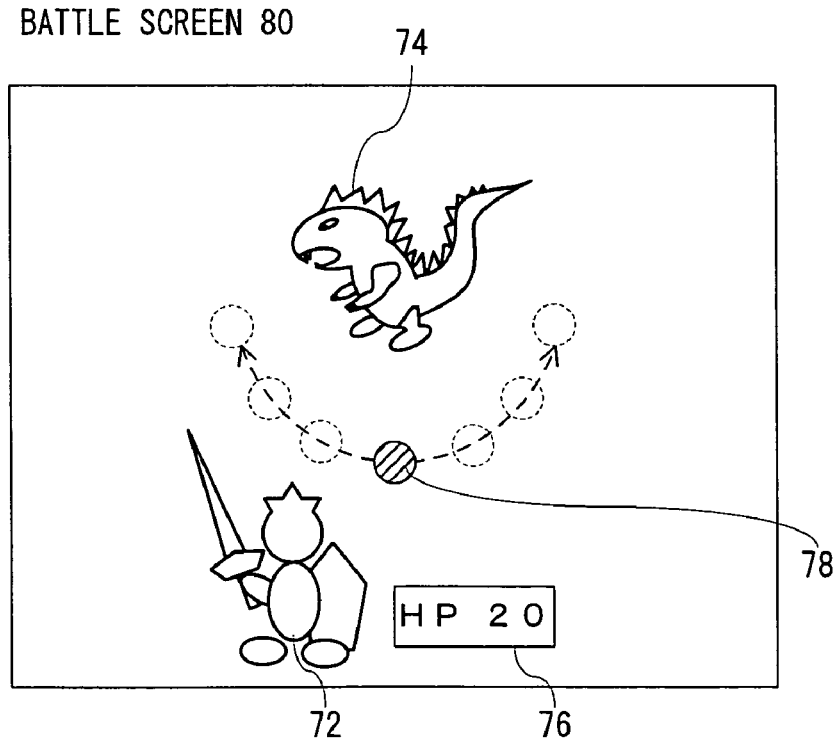

On a game screen 70 shown in FIG. 6 (A), a player character 72 moves in a game world (map) according to an operation by the player. Furthermore, enemy characters 74, and so on are also displayed on the game screen 70. It is noted that the enemy characters 74 is not displayed at all times and can be non-displayed depending upon a position of the player character 72.

When the player character 72 encounters the enemy character 74, a game screen shown in FIG. 6 (B) (battle screen) 80 is displayed. For example, on the battle screen 80, the player character 72 is placed at the bottom of the screen together with a displaying portion of the HP 76. On the other hand, the enemy character 74 with whom the player character 72 encounters is displayed at an upper center of the screen. Furthermore, an instruction image 78 for instructing (guiding) an operation timing (offensive timing) of the player is displayed in the center of the screen.

As understood from FIG. 6 (B), the instruction image 78 is circle, reciprocates (oscillates) so as to draw a semicircle (circular arc) to the rhythm of the operation timing pattern at least in the offensive turn of the player character 72 (like a pendulum), and changes its color when coming to a position that has to be operated by the player (the lowermost position shown in FIG. 6 (B) in this implementation). Although not shown by the drawing, the instruction image 78, for example, is changed to red at the lowermost position, and displays its outline in the same color as the background at positions except for the lowermost position.

It is noted that although the instruction image 78 changes its color at the lowermost position in this implementation, a form thereof is changed at a timing that has to be operated by the player, and both of the color and the form may be changed.

That is, in a case the battle screen 80 shown in FIG. 6 (B) (battle scene) is displayed, the BGM shown by the music information of the operation timing pattern assigned in correspondence to the encountered enemy character is played, and the instruction image 78 is displayed in an oscillating manner to the rhythm pattern so as to come to the lowermost position at a timing shown by the timing frame number. In this regard, it may be said that the instruction image 78 is moved in a rhythmic manner.

Figure 7:
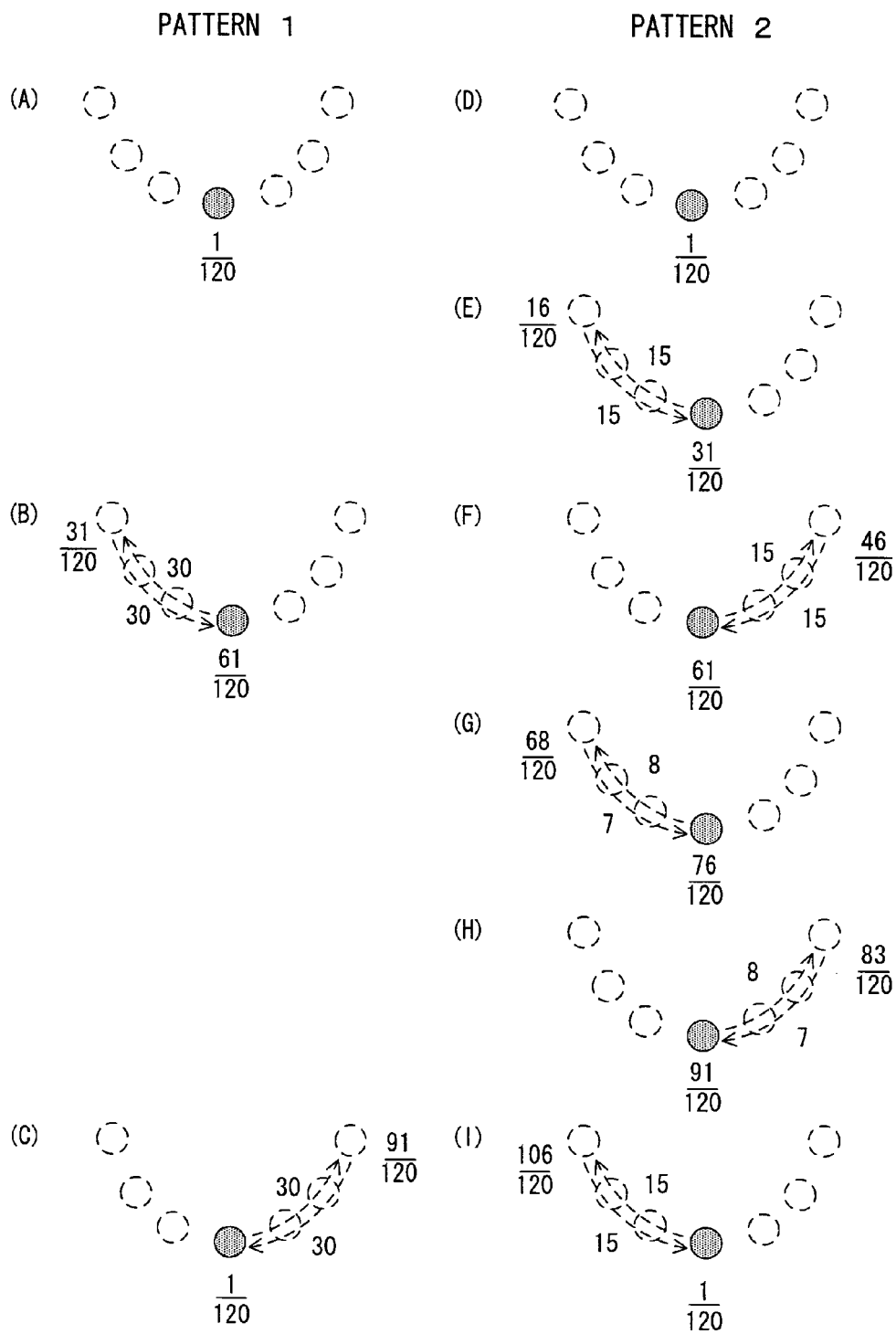
FIG. 7 is an illustrative view showing one example of an oscillating movement of an instruction image displayed on the battle screen shown in FIG. 6.

FIG. 7 is an illustrative view showing a state in which the instruction images 78 are displayed in an oscillating manner with respect to the pattern 1 and the pattern 2. In the pattern 1, the instruction image 78 is displayed at the lowermost position at a first frame (1/120) as shown in FIG. 7 (A), reached to the uppermost position on the left side during a period between a second frame and a thirty-first frame, and returned to the lowermost position during a period between a thirty-second frame and a sixty-first frame as shown in FIG. 7 (B). That is, the instruction image 78 oscillates halfway along the arc on the left side during a period of 60 frames. Then, the instruction image 78 is reached to the uppermost position on the right side during a period between a sixty-second frame and a ninety-first frame, and returned to the lowermost position during a period between a ninety-second frame and a one-hundred-and-twenty-first frame (first frame) as shown in FIG. 7 (C). That is, the instruction image 78 oscillates halfway along the arc on the right side during a period of successive 60 frames, and returned to the state as shown in FIG. 7 (A).

As to the pattern 2, the instruction image 78 is displayed at the lowermost position at a first frame (1/120) as shown in FIG. 7 (D), reached to the uppermost position on the left side during a period between a second frame and a sixteenth frame, and returned to the lowermost position during a period between a seventeenth frame and a thirty-first frame as shown in FIG. 7 (E). That is, the instruction image 78 oscillates halfway along the arc on the left side during a period of 30 frames. Next, the instruction image 78 is reached to the uppermost position on the right side during a period between a thirty-second frame and a forty-sixth frame, and returned to the lowermost position during a period between a forty-seventh frame and a sixty-first frame as shown in FIG. 7 (F). That is, the instruction image 78 oscillates halfway along the arc on the right side during a period of subsequent 30 frames, and returned to the state as shown in FIG. 7 (D). Succeedingly, the instruction image is reached to the uppermost position on the left side during a period between a sixty-second frame and a sixty-eighth frame, and returned to the lowermost position during a period between a sixty-ninth frame and a seventy-sixth frame as shown in FIG. 7 (G). That is, the instruction image 78 oscillates halfway along the arc on the left side during a period of subsequent 15 frames. Next, the instruction image 78 is reached to the uppermost position on the right side during a period between a seventy-seventh frame and an eighty-third frame, and returned to the lowermost position during a period between an eighty-fourth frame and a ninety-first frame as shown in FIG. 7 (H). That is, the instruction image 78 oscillates halfway along the arc on the right side during a period of subsequent 15 frames. Then, the instruction image is reached to the uppermost position on the left side during a period between a ninety-second frame and a one-hundred-and-sixth frame, and returned to the lowermost position during a period between a one-hundred-and-seventh frame and a one-hundred-and-twentieth frame (first frame). That is, the instruction image oscillates halfway along the arc on the left side during a period of last 30 frames.

It is noted that in a case that the instruction image 78 is displayed in an oscillating manner according to the pattern 2, a moving direction of the instruction image 78 according to the pattern 2 at the end is reversed between the odd number of times and the even number of times, and therefore, assuming that a case shown in FIG. 7 (D) to FIG. 7 (I) is an oscillating display of the instruction image 78 at the odd number of times, the moving direction of the instruction image 78 is reverse (symmetrical) to that at the even number of times in each case of FIG. 7 (D) to FIG. 7 (I).

Furthermore, as to the pattern 1 and the pattern 2, each of FIG. 7 (A) and FIG. 7 (D), each of FIG. 7 (B) and FIG. 7(F), and each of FIG. 7 (C) and FIG. 7 (I) is shown in a line, and this means a time (the number of frames) when the instruction image 78 is displayed at the lowermost position is equal to each other.

Specifically, the player weighs the timing of an attack (operation) by listening to a sound of the drum part of the music (BGM) to be played and viewing the instruction image 78 so as to attack the enemy character 74. For example, when the player operates the A button at a time that the instruction image 78 comes to the lowermost position or comes near thereto (within a predetermined range), a damage depending upon the position can be applied to the enemy character 74, and when the player operates the A button at a time that the instruction image 78 is away from the lowermost position or its vicinity (out of the predetermined range), the attack is regarded as a failure (mistake), and the offensive turn of the player character 72 is completed.

Figure 8:
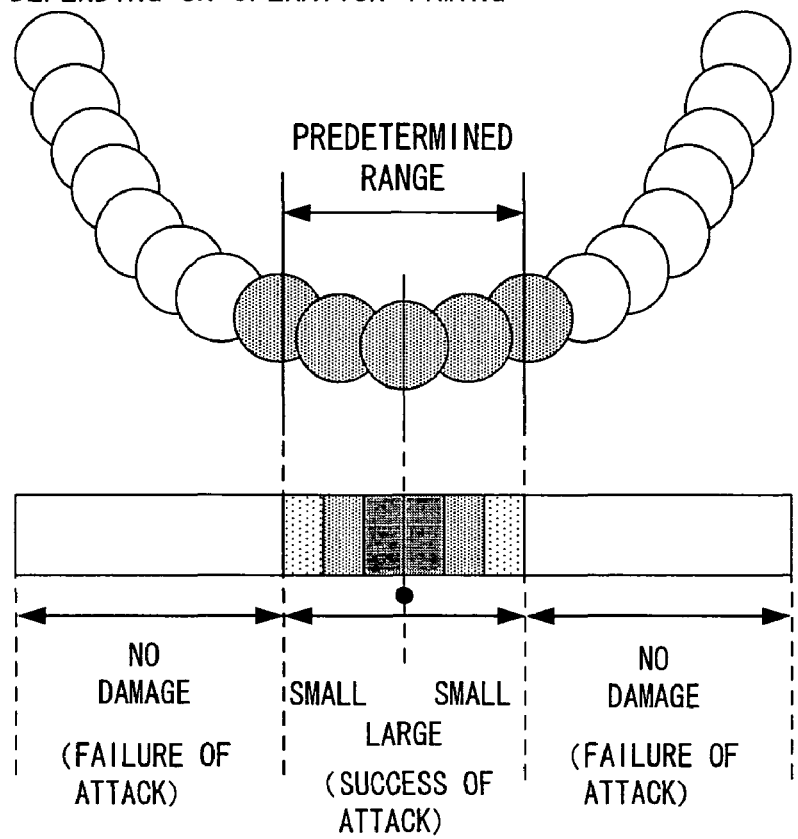
FIG. 8 is an illustrative view showing massiveness of damage depending upon an operation timing with respect to the oscillating movement of the instruction image displayed on the battle screen shown in FIG. 6.
Figure 8:
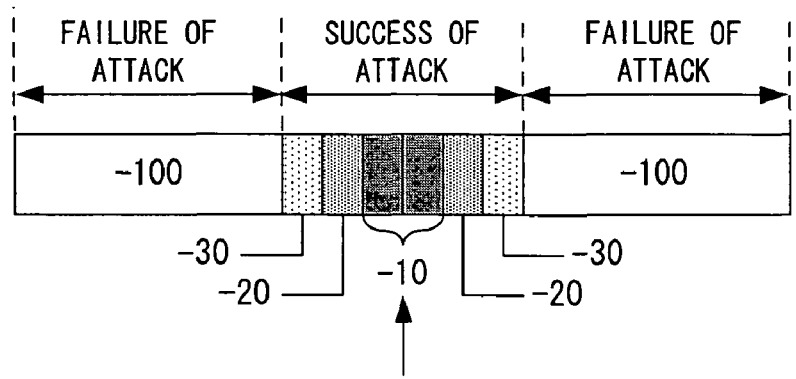

FIG. 8 (A) is an illustrative view showing small and large of the damage depending upon the operation timings. As shown in FIG. 8 (A), when the player operates the A button at a time that the instruction image 78 comes to the lowermost position or comes near thereto (within the predetermined rage), the attack is regarded as a success, and this makes it possible to apply a damage to the enemy character 74. In this implementation, the damage to be applied to the enemy character 74, i.e., the offensive power of the player character is maximum when a timing of an attacking operation by the player (operation timing) and a timing of the instruction image 78 being displayed at the lowermost position (lowermost position displayed timing) are coincident with each other, and as a degree of coincidence is low, the damage to be applied to the enemy character 74 is gradually smaller. Furthermore, if the degree of coincidence is out of a constant value, that is, if the operation timing exceeds the predetermined range (the degree of coincidence is within 3 frames in this implementation), the attack is regarded as a failure, and this makes it impossible to apply the damage to the enemy character 74.

It is noted that if no failing in the attack, it is possible to successively apply damages in a range within the number of times capable of attacking per one offensive turn ("groove point" in this implementation). For example, when the offensive turn of the player character 72 is started in this implementation, a groove point (groove value) is set to "100". Although omitted in FIG. 3, the groove value is stored in the data storing area 404 of the main memory 40 and reduced depending upon the operation timing every time that the player makes an attack (operation) in the battle scene as described later.

FIG. 8 (B) shows an illustrative view showing a reduced value of the groove value depending upon the operation timing. As shown in FIG. 8 (B), in a case that the degree of coincidence between the operation timing and the displayed timing is high, that is, in a case of a completely coincidence, and in a case of one frame of deviation in this implementation, the groove value is reduced by "10". Furthermore, in a case that the degree of coincidence between the operation timing and the displayed timing is medium, that is, in a case of two frames of deviation in this implementation, the groove value is reduced by "20". In addition, in a case that the degree of coincidence between the operation timing and the displayed timing is low, that is, in a case of three frames of deviation in this implementation, the groove value is reduced by "30". Then, in a case that the degree of coincidence between the operation timing and the displayed timing exceeds a constant value, that is, in a case that a range of the operation is out of a predetermined range (succeeding and preceding three frames of a complete coincidence), the groove value is reduced by "100".

If the groove value is equal to or less than "0", the offensive turn of the player character 72 is completed, and the offensive turn and the defensive turn are changed between the player character 72 and the enemy character 74. That is, the offensive turn of the enemy character 74 is started, and the defensive turn of the player character 72 comes. Then, when the offensive turn of the enemy character 74 is completed, the offensive turn of the player character 72 is started again. Thus, by alternately repeating the offensive turn and the defensives turn, the player character 72 and the enemy character 74 fight with each other, and when the player character 72 defeats the enemy character 74, the battle scene is completed. On the contrary thereto, when the enemy character 74 defeats the player character 72, the game is ended.

It is noted that in some cases, the groove value is added. In a case that the degree of coincidence between the operation timing and the displayed timing is successively high, the groove value is added in this implementation. For example, the groove value is added in a "5" to "10" range, and the greater the number of successive times is, the larger the added value is.

The groove value is calculated every time that the player performs an offensive operation, and when the value is equal to or less than "0", the offensive turn of the player character is completed. That is, for a player with high operation ability, the relatively large number of times of attacks is performed, and therefore, a greater damage is applied to the enemy character 74. On the other hand, for a player with low operation ability, the small number of times of attacks is performed, and therefore, a less damage is applied to the enemy character 74. Thus, the number of times of attacks is limited based on the groove value.

Furthermore, since the number of times of attacks is limited, if successively attacking the enemy character 74, it is possible that not only a damage depending upon the operation timing is merely accumulated but also a damage to be added is gradually (non-linearly) increased according to the number of times.

Thus, by merely inputting an offensive command, not a predetermined damage or a damage obtained by multiplying a ratio determined by the random number is applied to the enemy character, but the damage depending on the operation ability (skill) of the player can be applied to the enemy character 74. That is, the skill of the player is reflected on the content of the game.

Figure 9:
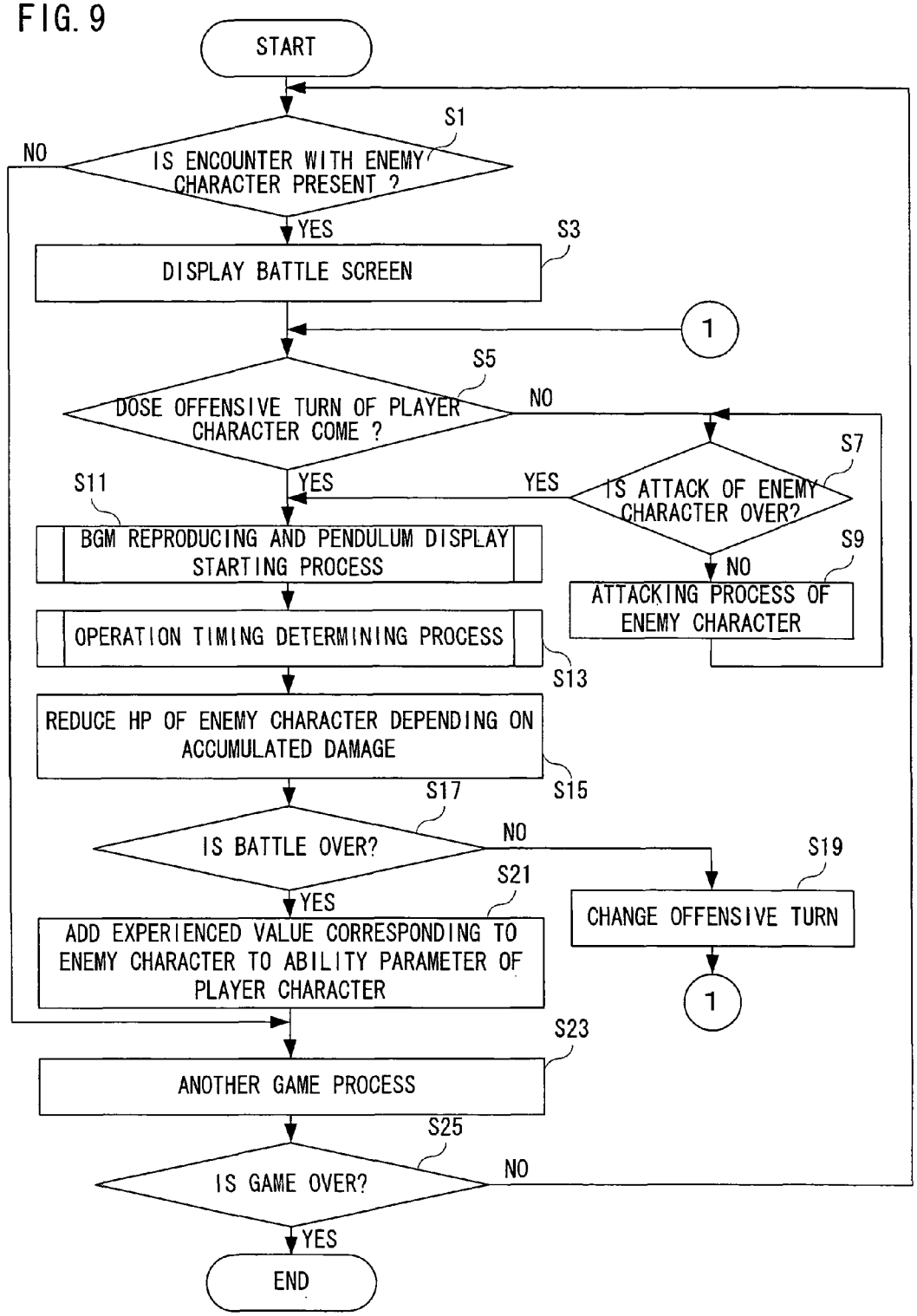
FIG. 9 is a flowchart showing a game process of a CPU shown in FIG. 2.

More specifically, the CPU 36 shown in FIG. 2 executes a game process according to a flowchart shown in FIG. 9. When the game is started, it is determined whether or not the player character 72 encounters the enemy character 74 in a step S1. If "NO" in the step S1, that is, if the player character 72 does not encounter the enemy character 74, the process directly proceeds to a step S23.

On the other hand, if "YES" in the step S1, that is, if the player character 72 encounters the enemy character 74, the battle screen 80 shown in FIG. 6 (B) is displayed in a step S3. In a following step S5, it is determined whether or not the offensive turn of the player character 72 comes. For example, directly after the battle screen 80 is displayed, the offensive turn of the player character 72 is normally started first, and every time the attack is ended, the offensive turn is changed between the player character 72 and the enemy character 74. It is noted that at a time of fighting with the enemy character 74 having an attribute superior in "agility", the offensive turn of the enemy character 74 is started first.

If "NO" in the step S5, that is, if the offensive turn of the enemy character 74 comes, it is determined that the attack of the enemy character 74 is completed in a step S7. If "NO" in the step S7, that is, if the offensive turn of the enemy character 74 is not completed, an offensive process of the enemy character 74 is executed in a step S9 and then, the process returns to the step S7. On the contrary thereto, if "YES" in the step S7, that is, if the offensive turn of the enemy character 74 is completed, the offensive turn and the defensive turn are changed between the player character 72 and the enemy character 74, that is, the offensive turn of the player character 72 is started, and then, the process proceeds to a step S11.

It is noted that although a detailed description of the offensive process as to the enemy character 74 is omitted, the attack of the enemy character 74 is determined in advance for each characters, and the enemy character 74 applies a damage to the player character 72 according to the game program by making an attack according to the experienced value of the player, for example. That is, the life (HP) of the player character 72 is reduced. It is noted that there is a possibility that the enemy character 74 fails in the attack, and in such the case, the HP of the player character 72 is not reduced, and the offensive turn of the player character comes.

On the other hand, if "YES" in the step S5, that is, if the offensive turn of the player character 72 comes, a BGM reproducing and pendulum display starting process (see FIG.

10) described later is executed in a step S11, then, an operation timing determining process (see FIG. 11 and FIG. 12) described later is executed in a step S13, and the HP of the enemy character 74 is reduced depending upon the accumulated damage in a step S15. Then, it is determined whether or not the battle is completed in a step S17. More specifically, it is determined whether or not the player character 72 defeats the enemy character 74.

If "NO" in the step S17, that is, if the player character 72 does not defeat the enemy character 74, it is determined that the battle is not completed, and whereby, the offensive turn and the defensive turn are changed between the player character 72 and the enemy character 74 in a step S19, that is, the offensive turn of the enemy character 74 is started and then, the process returns to the step S5. That is, the battle is continued. On the other hand, if "YES" in the step S 17, that is, if the player character 72 defeats the enemy character 74, it is determined that the battle is completed, and whereby, an experienced value corresponding to the enemy character 74 is added to the ability parameter of the player character 72, i.e., the experienced value in a step S21, and then, the process proceeds to a step S23.

As shown in FIG. 4, the experienced value of the enemy character 74 is shown by the range of the numerical values, and therefore, the experienced value to be added is determined based on the experienced value depending upon the accumulated damage within the range of the experienced value as to the enemy character 74. It is noted that it is appropriate that the experienced value depending upon the accumulated damage is calculated so as to be added.

Another game process is executed in the step S23. In belief, an image processing such as moving the player character 72 according to an operation by the player, moving the non-player character such as the enemy character 74 and etc., displaying (updating) images in the game space (game image 70 except for the battle screen herein), and so forth, a displaying processing of a message that has to be displayed according to the progress of the game, a sound output processing for outputting a music (BGM) required for the game and a sound (sound effect), and etc. are executed. It is noted that the sound output processing in another processing is the sound output processing except for the processing of reproducing the BGM in the battle scene. Furthermore, a backup processing of the game data sequentially updated according to the progress of the game is also executed as necessary. The backup processing may be executed according to an instruction by the player and may be automatically executed according to a predetermined event.

Then, it is determined whether or not the game is ended in a step S25. If "NO" in the step S25, that is, if the game is not ended, the process is returned to the step S1 so as to proceed (continue) the game. On the other hand, if "YES" in the step S25, that is, if the game is ended, the game processing is ended.

It is noted that in a case that it is determined that the attack of the enemy character 74 is completed in the step S7, the offensive turn of the player character 72 is started; however, in a case the enemy character 74 defeats the player character 72 in the offensive turn of the enemy character 74, the game is over (game over), and the game processing is ended as it is.

Figure 10:
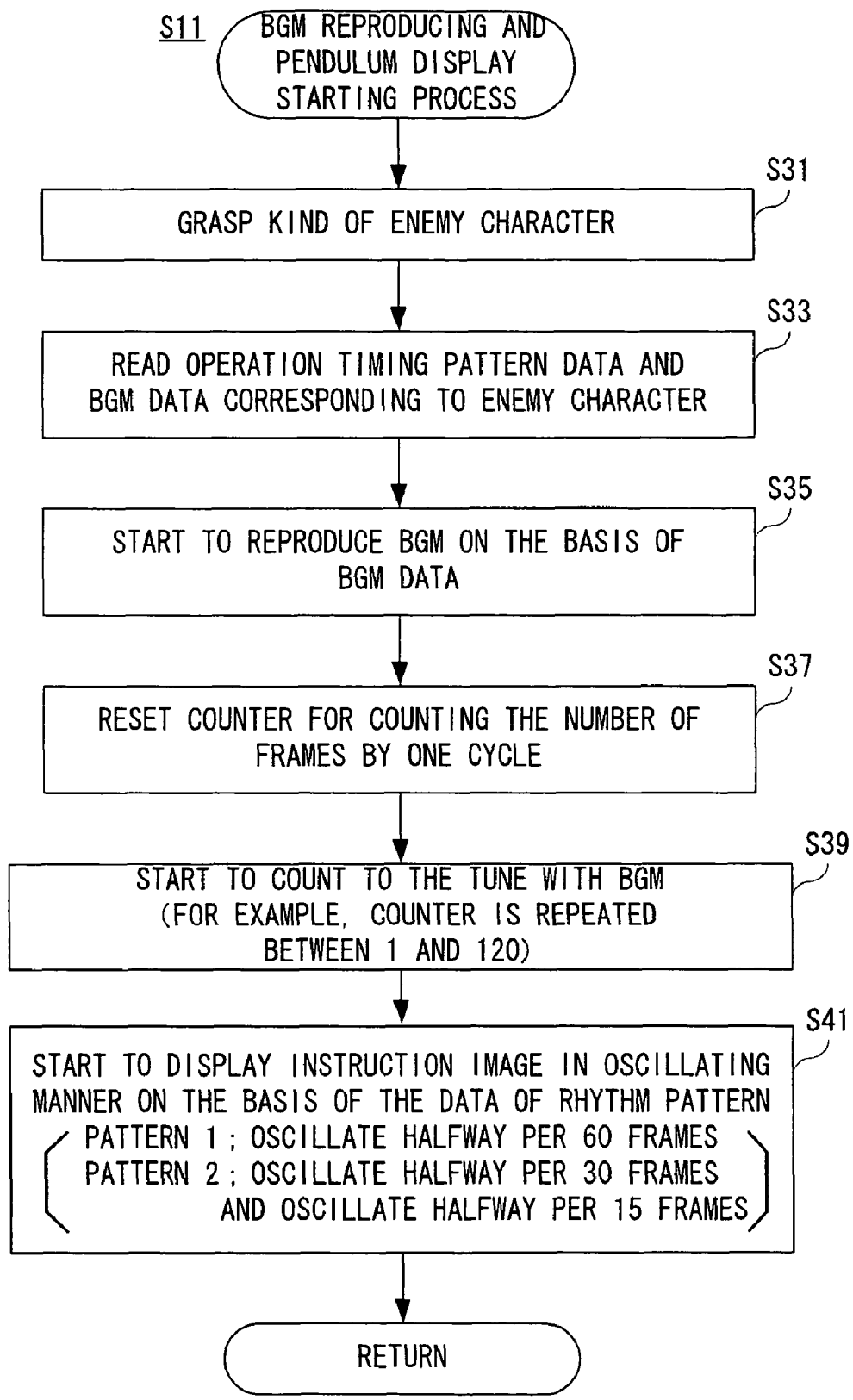
FIG. 10 is a flowchart showing a BGM reproducing and pendulum image starting process of the CPU shown in FIG. 2.

FIG. 10 is a flowchart showing the BGM reproducing and pendulum display starting process (step S11). When the CPU 36 starts the BGM reproducing and pendulum display starting process, a kind of the enemy character 74 is grasped in a step S31. That is, the player character 72 specifies the encountered enemy character 74. In a following step S33, the CPU 36 reads the operation timing pattern data 404c corresponding to the specified enemy character 74 from the data storing area 404 and reads the BGM data (sound data) 404d shown by the music information data included in the operation timing pattern data 404c from the data storing area 404. Then, the CPU starts to reproduce the BGM on the basis of the BGM data in a step S35.

Furthermore, the CPU resets a counter (omitted in FIG. 2) for counting the number of frames by one cycle in a step S37 and starts to count the counter to the tune of the BGM in a step S39. The counter, for example, is an up-counter which counts one cycle (120 frames in this implementation) and is reset and started if counted up to 120 (frames).

Then, an oscillating display of the instruction image 78 is started on the basis of the rhythm pattern data included in the operation timing pattern data 404c in a step S41, and then, the process is returned to the BGM reproducing and pendulum display starting process. More specifically, as shown in FIG. 7, in the pattern 1, the instruction image 78 starts to be displayed so as to oscillate halfway along the arc every 60 frames, and in the pattern 2, the instruction image 78 starts to be displayed so as to oscillate halfway along the arc every 30 frames or every 15 frames. Furthermore, the oscillating display is controlled so that the instruction image 78 comes to the lowermost position according to the data of the timing frame number included in the operation timing pattern data 404c, and a color of the instruction image 78 is changed at a timing show by the timing frame number.

It is noted that although the processing shown in steps S35 to S41 is described in chronological order, the reproducing of the BGM and the oscillating display of the instruction image 78 have to be synchronized with each other, and therefore, these processes are actually executed at the same time.

Figure 11:
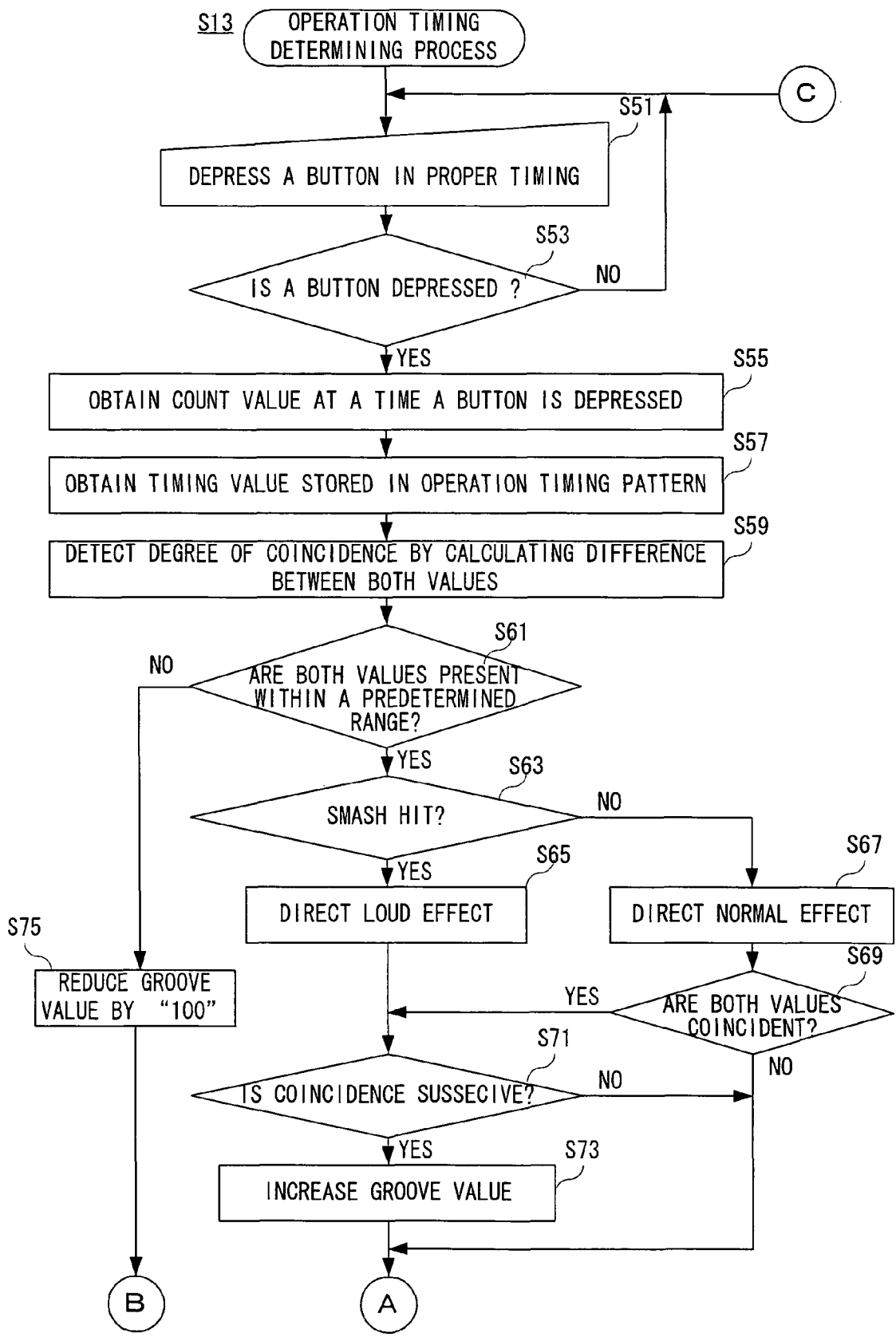
FIG. 11 is a flowchart showing a part of an operation timing determining process of the CPU shown in FIG. 2.
Figure 12:
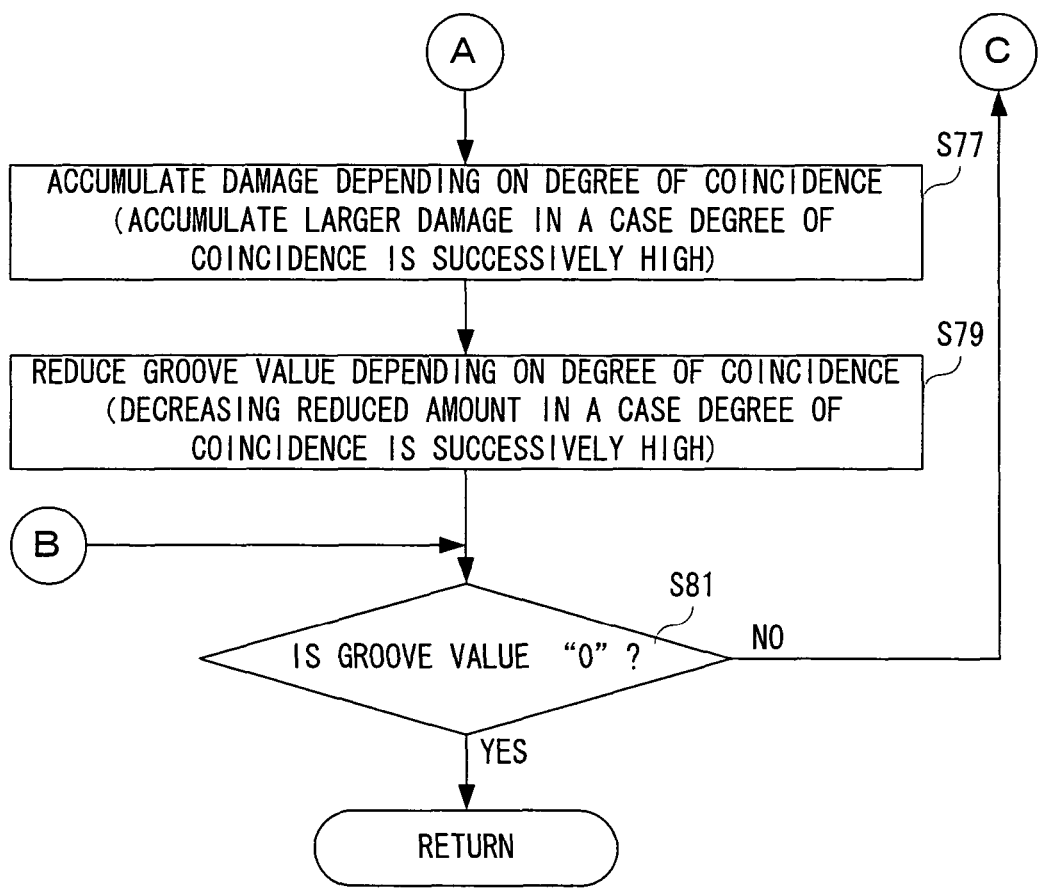
FIG. 12 is a flowchart showing another part of the operation timing determining process of the CPU shown in FIG. 2.

FIG. 11 and FIG. 12 is a flowchart showing a timing determining process (step S13). As shown in FIG. 11, when the CPU 36 starts the timing determining process, an operation of an attack is executed in proper timing by the player, e.g., an operation of the A button is executed in proper timing, so that the operation signal is input in a step S 51. In a following step S53, the CPU 36 obtains a state of the A button (e.g., obtains data from the controller buffer (not shown) of the controller I/F 56) and determines whether or not the A button is depressed. That is, it is determined whether or not the operation signal in response to the operation of the A button is input.

If "NO" in the step S53, that is, if the A button is not depressed, the process directly returns to the step S51. On the other hand, if "YES" in the step S53, that is, if the A button is depressed, the CPU 36 obtains a count value of the counter at a time that the A button is depressed, i.e., obtains an operation timing in a step S55, and obtains a timing value (data of the frame number) stored in the operation timing pattern data 404c, i.e., obtains a display timing in a step S57.

In a following step S59, the CPU 36 calculates a difference between the obtained count value and the timing value, and detects a degree of coincidence between them. Then, it is determined whether or not both the values exist within a predetermined range in a step S61. In this implementation, the obtained count value exists within the following and preceding three frames of the timing value by regarding the timing value as the center (coincident point). If "NO" in the step S61, that is, if the difference between the obtained count value and the timing value exceeds three frames, it is determined that both the values do not exist within the predetermined range, then, the groove value is reduced by "100" in a step S75, and the process proceeds to a step S81 shown in FIG. 12.

On the other hand, if "YES" in the step S61, that is, if the difference between the obtained count value and the timing value is equal to or less than three frames, it is determined that both the values exist within the predetermined range, and it is determined whether a smash hit or not in a step S63. Herein, the smash hit means an attack when the count value and the timing value are coincident with each other, and a predetermined probability is satisfied. Furthermore, the predetermined probability is determined by an equation or a random number set in advance by a designer or programmer of the game.

If "YES" in the step S63, that it, if the smash hit, a loud effect is directed in a step S65, and then, the process proceeds to a step S71. For example, a color and brightness of the battle screen 80 is changed, the battle screen 80 itself is changed, a sound (sound effect) generated at a time of attacking or applying a damage to the enemy character 74 is made louder or changed, or the like. In a case of changing the sound, a monotone is output so as to become a chord, or a surround component of the sound is made larger.

On the other hand, if "NO" in the step S63, that is, if not smash hit, a normal effect is directed in a step S67. That is, the loud effect is not directed, but the sound effect of the normal battle screen 80, the attack and etc. are output. In a following step S69, it is determined whether or not both the values are coincident with each other. That is, it is determined whether or not the obtained count value and the timing value are coincident with each other. If "NO" in the step S69, that is, if both the values are not coincident with each other, the process directly proceeds to a step S77 shown in FIG. 12. On the other hand, if "YES" in the step S69, that is, if both the values are coincident with each other, the process proceeds to the step S71.

In the step S71, it is determined whether or not the coincidence between the values is successive. If "NO" in the step S71, that is, if the coincidence is not successive, the process proceeds to a step S75. On the other hand, if "YES" in the step S71, that is, if the coincidence is successive, a groove value is added as described above in a step S73, and then, the process proceeds to the step S77.

In the step S77, a damage depending upon a degree of coincidence is accumulated. For example, in a case the degree of coincidence is high, a large damage is accumulated, and in a case that the degree of the coincidence is low, a small damage is accumulated. Furthermore, in a case the degree of coincidence is successively high, a larger damage is accumulated.

It is noted that although a damage to be accumulated is determined depending upon the degree of coincidence in this implementation, as to the smash hit, a larger damage may be accumulated than that in a case the count value and the timing value are coincident with each other.

In a following step S79, the groove value is reduced depending upon the degree of coincidence. As described above, in a case that the degree of coincidence is successively high, the groove value is increased, and therefore, a reduced amount is small. Alternatively, in a case that the degree of coincidence is successively high, the groove value is not increased while the reduced amount is rendered small. Alternatively, it is appropriate that in a case that the degree of coincidence is successively high, the groove value is increased and the reduced amount is also rendered small.

Then, it is determined whether or not the groove value is "0" in a step S81. Strictly speaking, it is determined whether or not the groove value is equal to or less than "0". If "NO" in the step S81, that is, if the groove value is larger than "0", it is determined that the number of attacks in the offensive turn remains, and then, the process returns to the step S51 shown in FIG. 11. On the other hand, if "YES" in the step S81, that is, the groove value is equal to or less than "0", it is determined the number of attacks in the offensive turn does not remain, and it is returned to the operation timing determining process.

According to this implementation, the player character can apply a damage to the enemy character depending upon the operation timing by the player in the battle scene in which the player character and the enemy character fight with each other, and obtain the experienced value depending upon the operation timing, and therefore, it is possible to reflect an operation ability of the player on the content of the game. That is, it is possible to improve a facilitating aspect and an entertainment aspect of the game.

It is noted that although a description is only made on a video game apparatus connected to the monitor in this implementation, it is needless to say that this is applicable to a game apparatus having a monitor built-in, a portable game apparatus, a cellular phone with game function, and etc.

Furthermore, although the BGM corresponding to the enemy character is played in the battle scene in this implementation, only the drum part may be played.

In addition, although the displaying manner of the instruction image is changed on the basis of the rhythm of the drum part in this implementation, the displaying manner may be changed on the basis of the timing frame number. In such a case, there is no need to store the data of the rhythm pattern in the operation timing pattern data 404c.

Furthermore, although the rhythm pattern is played at a ratio of 120 frames per measure, and the displaying manner of the instruction image is changed in this implementation, the number of frames may be changed depending upon the level (experienced value) of the player character. Also, it is possible that in a case that the degree of coincidence is successively high in the offensive turn of the player character, the number of frames is gradually changed. It is possible that in a case the level of the player character is high, or in a case that the degree of coincidence is successively high, for example, the rhythm pattern is played at a ratio less than 120 frames per measure (e.g., 60 frames). It is noted that in a case that the degree of coincidence is successively high, the number of frames is gradually reduced.

Furthermore, although the instruction image 78 is displayed in an oscillating manner in this implementation, the displaying manner is not limited thereto.

Figure 13:
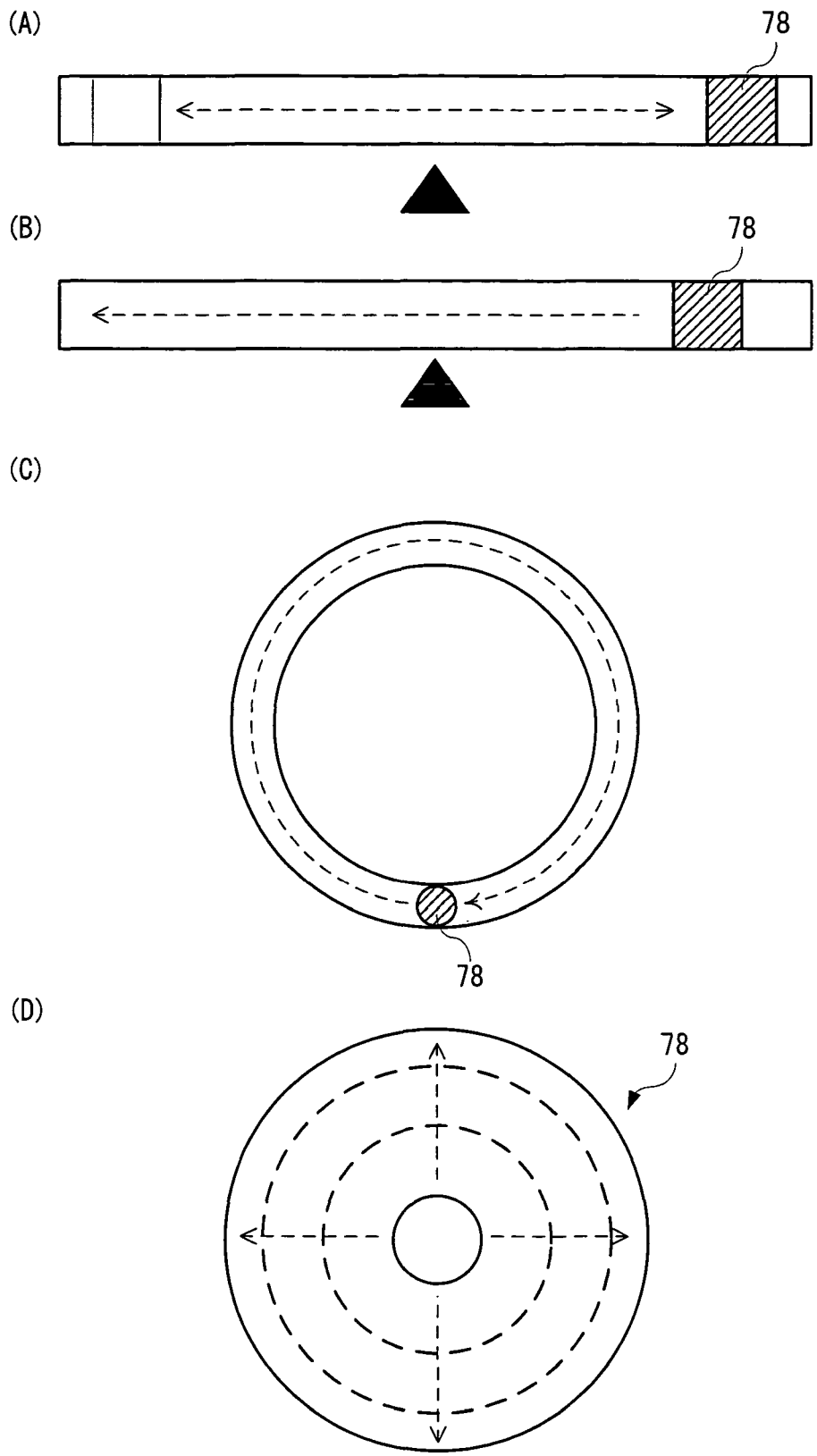
FIG. 13 is an illustrative view showing another example of an instruction image displayed on the battle screen shown in FIG. 6.

For example, as shown in FIG. 13 (A), an instruction can be made such that the instruction image 78 is moved in an oscillating manner on a line and is subjected to an offensive operation at a position shown by the mark of triangle. Furthermore, as shown in FIG. 13 (B), an instruction can be made such that the instruction image is moved to only one direction on the line and is subjected to an offensive operation at a position shown by the mark of triangle. In this case, the instruction image 78 is moved from a right end to a left end and then, is displayed at the right end again, and this process is repeated.

It is noted that in FIG. 13 (A) and FIG. 13 (B), the instruction image is moved such that timing of the instruction image coming just above the mark of triangle and timing of the timing frame number are coincident with each other, and at the coincident position, a color of the instruction image is changed.

Furthermore, as shown in FIG. 13 (C), the instruction image 78 is moved in a circle manner so as to be subjected to the offensive operation at a lowermost position. In such a case, the instruction image moves in a circle manner so as to come to the lowermost position at the timing indicated by the timing frame number. It is noted that a position indicative of the operation timing needs not to be limited to the lowermost position, and it may be another specific position such as an upper most position. In this case also, a color of the instruction image is changed at the position indicative of the operation timing.

Although as shown in FIG. 13 (A) to FIG. 13 (C), the operation timing is indicated by displaying the instruction image 78 in a moving manner similarly to this implementation, as shown in FIG. 13 (D), the operation timing can be indicated by changing a form (size) of the instruction image 78. In FIG. 13 (D), the instruction image 78, for example, has a circle shape and is displayed so as to gradually become larger. Then, when the circle becomes the largest, an offensive operation can be performed. In such a case, the largest circle is displayed and then, the smallest circle is displayed, and a timing is weighted at a time the circle is changed from the smallest circle to the largest circle. In such a case also, a color of an outline of the circle may be changed at a position indicative of the operation timing. Furthermore, a form of the circle is not changed from the smallest circle to the largest circle, but is changeable between them. In this case, the offensive operation is instructed at a time of the largest circle or the smallest circle.

Although not illustrated, a timing to be operated by the player can be instructed by blinking (display/non-display) the instruction image 78 shown in the above-described implementation at a predetermined position. It is appropriate that in such a case, the instruction image 78 is displayed at the timing indicated by the timing frame number, and the instruction image 78 is non-displayed except for that.

In addition, it is appropriate that although not illustrated, the enemy character 74 is changed so as to have a function of the instruction image 78, and whereby, the operation timing is instructed to the player by the enemy character 74 only.

Still furthermore, it is appropriate that although the instruction image is displayed, and the BGM is reproduced in the above-described implementation, only the reproduction of the BGM is executed. In such the case, by listening to the BGM, the player can weight the operation timing according to the rhythm pattern (drum part). In its operation, in the step S11 shown in FIG. 9, only the reproduction of the BGM is executed, and therefore, in FIG. 10 showing its detail, the process in the step S41 is erased.

Since the video game system 10 of another implementation is the same as the above-described implementation except that the operation timing pattern data 404c is set for each player character, a duplicated description is omitted.

Figure 14:
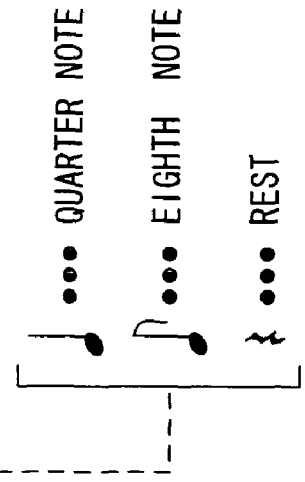
FIG. 14 is an illustrative view showing a content of the operation timing pattern data stored in a main memory in another implementation.

As shown in FIG. 14, the operation timing pattern is assigned in correspondence to each of the player characters A, B, . . . in that implementation. Since a content of the operation timing pattern is the same as the above-described implementation, a detailed description is omitted herein.

In that implementation, as to the operation timing pattern, different patterns are assigned depending upon a level (rank) of the offensive ability of the player character (difficulty level of the operation). That is, in a case of selecting the player character of low rank, the player can perform an offensive operation according to a relatively easy operation timing pattern. On the other hand, in a case of selecting the player character of high rank, the player can perform an offensive operation according to a relatively difficult (complicated) timing pattern.

Accordingly, in that implementation, it is possible to direct such that massiveness of the damage to be applied to the enemy character 74 and largeness of the experienced value are changed depending upon the difficulty level of the operation timing pattern as well as the operation timing.

Furthermore, a detailed process by the CPU 36 in that implementation is approximately the same as the process described by use of the flowcharts shown in FIG. 9 to FIG. 12 in the above-described implementation, and therefore, a detailed description is omitted.

That implementation is different from the above-described implementation in that in the BGM reproducing and pendulum display starting process shown in FIG. 10 (in the step S11), the kind of the player character is grasped (specified) in the step S31, and the operation timing pattern data 404c and the BGM data corresponding to the specified player character is read in the step S33.

In that implementation also, it is possible to reflect an operation ability of the player on the content of the game, and it is possible to improve an entertainment aspect of the game.

While the technology herein has been described and illustrated in detail in connection with exemplary illustrative non-limiting implementations, it is clearly understood that the same is by way of illustration and example only and is not to be taken by way of limitation. The invention is intended to be defined by the claims and to cover all corresponding and equivalent arrangements whether or not specifically disclosed herein.

What is claimed is:

1. A game apparatus displaying a battle scene in which characters in a game world fight with each other, comprising:
one or more first storage locations for storing one or more parameters for each enemy appearing in said game world;
one or more second storage locations for storing, for a plurality of enemies, one or more operation timing patterns indicating the timing of one or more sequential player inputs to be input in association with a corresponding enemy, the operation timing patterns having different difficulty levels of operation, the different enemies having different operation timing patterns;
input pattern changing programmed logic circuitry for displaying, when the battle scene is displayed, an input pattern stored for at least one enemy appearing in said battle scene and changing the display of said input pattern on the basis of one of the one or more operation timing patterns stored for the enemy appearing in said battle scene in said one or more second storage locations and on the basis of said difficulty levels;
operation detecting programmed logic circuitry for detecting an operation by said player input in response to a change of said input pattern;
changing value calculating programmed logic circuitry for calculating a changing value for changing the parameter of the enemy depending upon a degree of coincidence between the timing of the detected operation and the timing of the operation timing pattern; and
parameter updating programmed logic circuitry for updating the parameter of the enemy appearing in said battle scene on the basis of the changing value calculated by said changing value calculating programmed logic circuitry.

2. The game apparatus according to claim 1, wherein
said one or more second storage locations store, for a plurality of enemies, operation timing patterns having different difficulty levels of operation, and
said input pattern changing programmed logic circuitry changes the display of said input pattern on the basis of an operation timing pattern associated with any one of an offensive enemy and a defensive enemy.

3. The game apparatus according to claim 1, wherein
the parameter includes a physical strength parameter on which an ability of the enemy to continue a battle depends, and
said parameter updating programmed logic circuitry reduces the physical strength parameter of a defensive enemy such that the defensive enemy appearing in said battle scene is damaged on the basis of the changing value calculated by said changing value calculating programmed logic circuitry.

4. The game apparatus according to claim 1, wherein
said input pattern changing programmed logic circuitry changes the displaying manner by displaying said input pattern in one of a rhythmic manner, an enlarged/reduced manner, and a displayed/non-displayed manner on the basis of the operation timing pattern stored for the enemy appearing in said battle scene.

5. The game apparatus according to claim 1, wherein
said input pattern changing programmed logic circuitry changes at least one of a color and a shape of said input pattern at the timing that has to be operated by said player on the basis of the operation timing pattern.

6. The game apparatus according to claim 1, further comprising
music reproducing programmed logic circuitry for reproducing music data for playing BGM in said battle scene, wherein
said one or more second storage locations store the music data which is utilized as the operation timing pattern and is comprised of a plurality of kinds of parts, each being a reproduction object by said music reproducing programmed logic circuitry, and
said input pattern changing programmed logic circuitry changes the display of said input pattern based on any one of the parts constituting the music data when said BGM is being played by said music reproducing programmed logic circuitry.

7. The game apparatus according to claim 1, wherein
the parameter includes an ability parameter on which a fighting capability strength of the character depends, and
said parameter updating programmed logic circuitry updates the ability parameter of the character on the basis of the changing value calculated by said changing value calculating programmed logic circuitry when the battle is ended.

8. The game apparatus according to claim 1, wherein
said changing value calculating programmed logic circuitry calculates the changing value so as to significantly change the parameter of the enemy as the detected player operation timing and the timing of the operation timing pattern more closely coincide.

9. The game apparatus according to claim 1, wherein
said operation timing pattern is constructed so as to be successively operated at a plurality of timing inputs by said player, and
said changing value calculating programmed logic circuitry calculates, every time that the operation by said player is detected by said operation detecting programmed logic circuitry, the changing value depending upon a degree of coincidence between the operation timing and the timing of the operation timing pattern.

10. The game apparatus according to claim 9, wherein
said changing value calculating programmed logic circuitry gradually increases the changing value when the degree of coincidence between the detected player operation timing and the timing of the operation timing pattern is successively high.

11. The game apparatus according to claim 9,
further comprising turn changing programmed logic circuitry for allowing successive operations by said player, provided the degree of coincidence is not lower than a predetermined value, and making a change between an offensive turn and a defensive turn at a time that the degree of coincidence becomes lower than the predetermined value, wherein
said battle scene is provided for the characters to fight each other by alternately repeating said offensive turn and said defensive turn.

12. The game apparatus according to claim 1, further comprising
one or more third storage locations for storing the number of allowed operations indicative of the number of operations by said player that are allowed;
number of times reducing programmed logic circuitry for reducing the number of allowed operations depending upon an operation of said player; and
operation ending programmed logic circuitry for ending the operation by said player when the number of allowed operations becomes 0.

13. The game apparatus according to claim 12, further comprising
a number of times increasing programmed logic circuitry for increasing the number of allowed operations when the player operation timing and the operation timing pattern closely coincide successive times.

14. The game apparatus according to claim 1, wherein the consequence is related to an amount of damage to be done to at least one said enemy in the plurality of enemies and the optimal timing pattern is related to the likelihood that the amount of damage will be done to the at least one said enemy.

15. A non-transitory memory medium tangibly encoded with a game program for execution by a computer of a game apparatus in order to display a battle scene in which characters in a game world fight with each other, said computer executing for the game program at least:
storing, in one or more first storage locations, one or more parameters for each enemy appearing in said game world;
storing, in one or more second storage locations, one or more operation timing patterns indicating the timing of one or more sequential player inputs to be input in association with a corresponding enemy, the operation timing patterns having different difficulty levels of operation, the different enemies having different operation timing patterns;
displaying, when the battle scene is displayed, an input pattern stored for at least one enemy appearing in said battle scene and changing the display of said input pattern on the basis of one of the one or more operation timing patterns stored for the enemy appearing in said battle scene in said one or more second storage locations and on the basis of said difficulty levels;
detecting an operation by said player input in response to a change of said input pattern;
calculating a changing value for changing the parameter of the enemy depending upon a degree of coincidence between the detected player operation timing and the timing of the operation timing pattern; and
updating the parameter of the enemy being appearing in said battle scene on the basis of the calculated changing value.

16. The memory medium encoded with a game program according to claim 15, wherein
said one or more second storage locations store, for a plurality of enemies, operation timing patterns having different difficulty levels of operation, and further comprising changing the display of said input pattern on the basis of an operation timing pattern associated with any one of an offensive enemy and a defensive enemy.

17. The memory medium encoded with a game program according to claim 15, wherein
the parameter includes a physical strength parameter on which an ability of the enemy to continue the battle depends, and
the physical strength parameter of a defensive enemy is reduced such that the defensive enemy appearing in said battle scene is damaged on the basis of the calculated changing value.

18. The memory medium encoded with a game program according to claim 15, wherein
the displaying manner is changed by displaying said input pattern in a rhythmic manner, an enlarged/reduced manner, or a displayed/non-displayed manner on the basis of the operation timing pattern stored for the enemy appearing in said battle scene.

19. The memory medium encoded with a game program according to claim 15, wherein
at least one of a color and a shape of said input pattern is/are changed at the timing that has to be operated by said player on the basis of the operation timing pattern.

20. The memory medium encoded with a game program according to claim 15, further comprising:
reproducing music data for playing BGM in said battle scene, wherein said one or more second storage locations store the music data which is utilized as the operation timing pattern and comprises a plurality of kinds of parts each being a reproduction object by said music reproducing programmed logic circuitry, and
changing the display of said input pattern on the basis of any one of the parts constituting said music data when said BGM is played.

21. The memory medium encoded with a game program according to claim 15, wherein
the parameter includes an ability parameter on which a fighting capability strength of the character depends, and
the ability parameter of the character is updated on the basis of the calculated changing value when the battle is ended.

22. The memory medium encoded with a game program according to claim 15, further comprising
calculating the changing value so as to significantly change the parameter of the enemy as the detected player operation timing and the timing of the operation timing pattern more closely coincide.

23. The memory medium encoded with a game program according to claim 15, wherein
said operation timing pattern is constructed so as to be successively operated at a plurality of timed inputs by said player, and
further comprising calculating, every time that the operation by said player is detected by said operation detecting programmed logic circuitry, the changing value depending upon a degree of coincidence between the operation timing and the timing of the operation timing pattern.

24. The memory medium encoded with a game program according to claim 23, further comprising
gradually increasing the changing value when the detected operation timing and the timing of the operation timing pattern closely coincide successive times.

25. The memory medium encoded with a game program according to claim 23, further comprising allowing successive operations by said player, provided the degree of coincidence is not lower than a predetermined value, and making a change between an offensive turn and a defensive turn at a time that the degree of coincidence becomes lower than the predetermined value, and
wherein a battle scene is provided for the characters to fight each other by alternately repeating said offensive turn and said defensive turn.

26. A game method of a game apparatus which displays a battle scene in which characters in a game world fight with each other and has one or more first storage locations for storing one or more parameters for each enemy appearing in said game world and one or more second storage locations for storing one or more operation timing patterns showing player input timing patterns to be input in association with a corresponding enemy, the operation timing patterns having different difficulty levels of operation, the different enemies having different operation timing patterns, the method comprising:
displaying, when the battle scene is displayed, an input pattern and changing a display of said input pattern on the basis of the one or more operation timing patterns stored in said one or more second storage locations and associated with the enemy appearing in said battle scene and on the basis of said difficulty levels;
detecting an operation input by said player in response to a change of said input pattern;
calculating a changing value for changing the parameter of the enemy depending upon a degree of coincidence between the detected player operation timing and the timing of the operation timing pattern; and
updating the parameter of the enemy appearing in said battle scene on the basis of the changing value calculated by said calculating.

27. The game method according to claim 26, wherein
said one or more second storage locations store, for a plurality of enemies, operation timing patterns having different levels of difficulty, and
said displaying changes the display of said input pattern on the basis of the operation timing pattern related with any one of an offensive enemy and a defensive enemy.

28. The game method according to claim 26, wherein
the parameter includes a physical strength parameter on which an ability of an enemy to continue a battle depends, and
said updating reduces the physical strength parameter of a defensive enemy such that said defensive enemy being appearing in said battle scene is damaged on the basis of the changing value calculated by said calculating.

29. The game method according to claim 26, wherein
said displaying changes the displaying manner by displaying said input pattern in a rhythmic manner, an enlarged/reduced manner, or a displayed/non-displayed manner on the basis of the operation timing pattern associated with the enemy appearing in said battle scene.

30. The game method according to claim 26, wherein
said displaying changes at least one of a color and a shape of said input pattern at the timing to be input by said player on the basis of the operation timing pattern.

31. The game method according to claim 26, wherein
said game apparatus further comprises music reproducing programmed logic circuitry for reproducing music data for playing BGM in said battle scene, said one or more second storage locations store the music data which is utilized as the operation timing pattern and includes a plurality of kinds of parts, each being a reproduction object by said music reproducing programmed logic circuitry, and said displaying changes the display of said input pattern on the basis of any one of the parts constituting said music data when said BGM is played by said music reproducing programmed logic circuitry.

32. The game method according to claim 26, wherein
the parameter includes an ability parameter on which a fighting capability strength of the character depends, and said updating updates the ability parameter of the character on the basis of the changing value calculated by said calculating when the battle is ended.

33. The game method according to claim 26, wherein
said calculating calculates the changing value so as to change the parameter of the enemy to a greater degree as the detected player operation timing and the timing of the operation timing pattern more closely coincide.

34. The game method according to claim 26, wherein
said operation timing pattern is constructed so as to be successively operated by said player at a plurality of timings, and said calculating calculates, every time that an operation by said player is detected by said detecting, the changing value depending upon a degree of coincidence between the player operation timing and the timing of the operation timing pattern.

35. The game method according to claim 34, wherein
said calculating gradually increases the changing value when the operation timing detected by said detecting and the timing of the operation timing pattern closely coincide successive times.

36. The game method according to claim 34, further comprising allowing successive operations by said player, provided the degree of coincidence is not lower than a predetermined value, and making a change between said offensive turn and said defensive turn at a time that the degree of coincidence becomes lower than the predetermined value, wherein said battle scene is provided for the characters to fight with each other by alternately repeating an offensive turn and a defensive turn.

37. A game apparatus displaying a battle scene in which characters in a game world fight with each other, comprising:
one or more first storage locations for storing one or more parameters for each enemy appearing in said game world;

one or more second storage locations for storing, in association with said each enemy, background music that renders one or more operation timing patterns presenting a player with timing patterns to be operated in a rhythm pattern, the operation timing patterns having different difficulty levels of operation, the different enemies having different operation timing patterns;

BGM reproducing programmed logic circuitry for reproducing background music stored in said one or more second storage locations and associated with the enemy appearing in said battle scene on the basis of said difficulty levels;

operation detecting programmed logic circuitry for detecting an operation input by said player after the background music starts to be reproduced;

changing value calculating programmed logic circuitry for calculating a changing value for changing the parameter of the enemy depending upon a degree of coincidence between the detected player operation timing and the timing of the rhythm pattern of said background music; and parameter updating programmed logic circuitry for updating the parameter of the enemy appearing in said battle scene on the basis of the changing value calculated by said changing value calculating programmed logic circuitry.

38. The game apparatus according to claim 37, wherein
said changing value calculating programmed logic circuitry gradually increases the changing value when the operation timing of said player detected by said operation detecting programmed logic circuitry and the timing of the rhythm pattern closely coincide successive times.

39. A game apparatus for displaying a battle scene in which characters in a game world fight with each other, comprising:
at least one first storage location that stores at least one parameter for each enemy appearing in said game world;

at least one second storage location that stores timing frame numbers indicative of a plurality of timings at which a player is to make operations, rhythm patterns corresponding to the timings, and music data including information of the rhythm patterns, in association with respective enemy characters, the rhythm patterns having different difficulty levels of operation, the different enemies having different rhythm patterns;

music reproduction programmed logic circuitry that reproduces the music data in a battle scene based at least in part on the difficulty levels;

a counter that starts to count a frame number in synchronization with a start of a reproduction of the music data produced by said music reproduction programmed logic circuitry;

operation detection programmed logic circuitry that detects a player input operation;

changing value calculation programmed logic circuitry that calculates, in accordance with a difference between a count value of said counter at the time an input is detected by the operation detection programmed logic circuitry and the frame number when the player was to have made the input, a changing value by which a parameter of the enemy character is changed;

parameter update programmed logic circuitry that updates the parameter of the enemy character appearing in the battle scene according to the calculated changing value;

at least one third storage location that stores a determining value;

determining value decreasing programmed logic circuitry that decreases the determining value in accordance with the difference calculated by the changing value calculation programmed logic circuitry; and turn ending determining programmed logic circuitry that determines whether or not said determining value is equal to or less than a predetermined threshold value, wherein dependent on a determination that said determining value is not equal to or less than a threshold value, at least the operation detection programmed logic circuitry continues to detect operation input, the changing value calculation programmed logic circuitry continues to determine a difference and calculate a changing value, the determining value decreasing programmed logic circuitry continues to decrease the determining value, and the turn end determining programmed logic circuitry continues to make a determination by comparing the determining value to the predetermined threshold value.

40. The game apparatus of claim 39, wherein said one or more parameters includes a physical strength parameter on an ability of an enemy character to continue a battle depends, and said parameter updating programmed logic circuitry reduces the physical strength parameter of the enemy character on the basis of the changing value.

41. The game apparatus of claim 39, wherein the determining value decreasing programmed logic circuitry decreases the determining value such that the determining value becomes equal to or less than said threshold value if said difference is above a predetermined difference value.

42. The game apparatus of claim 39, further including determining value increasing programmed logic circuitry that increases said determining value when said count value and said frame number are successively coincident with each other.

43. The game apparatus of claim 39, wherein the determining value decreasing programmed logic circuitry determines an amount by which said determining value is decreased when said difference is successively smaller than a predetermined value.

44. The game apparatus of claim 39, wherein the consequence is related to an amount of damage to be done to at least one said enemy and the optimal timing pattern is related to the likelihood that the amount of damage will be done to the at least one said enemy.

45. A non-transitory computer readable storage medium comprising a program to be executed by a computer of a game apparatus in order to display a battle scene in which characters in a game world fight with each other, said execution causing said computer to perform at least:

storing at least one parameter for each enemy appearing in said game world;
storing timing frame numbers indicative of a plurality of timings at which a player is to make operations, rhythm patterns corresponding to the timings, and music data including information of the rhythm patterns, in association with respective enemy characters, the rhythm patterns having different difficulty levels of operation, the different enemies having different rhythm patterns;
reproducing the music data in a battle scene based at least in part on the difficulty levels;
starting to count a frame number in synchronization with a start of the reproduced music data;
detecting an input operation by the player;
calculating, in accordance with a difference between a count at the time an input is detected by said detecting and the frame number when the player was to have made the input, a changing value by which a parameter of the enemy character is changed;
updating the parameter of the enemy character appearing in the battle scene according to the calculated changing value;
at least one third storage location that stores a determining value;
decreasing the determining value in accordance with the difference calculated by the changing value calculation programmed logic circuitry; and
determining whether or not said determining value is equal to or less than a predetermined threshold value, wherein dependent on a determination that said determining value is not equal to or less than a threshold value, the operation detection programmed logic circuitry continues to detect operation input, at least the changing, decreasing, and determining continues.

46. A game apparatus displaying a battle scene in which character in a game world fight with each other, comprising:

at least one first storage location that stores at least one parameter for each enemy character appearing in said game world;
at least one second storage location that stores music data including input patterns indicative of a plurality of timings at which a player is to make operations, said patterns each being associated with one or more enemy characters, the patterns having different difficulty levels of operation, the different enemies having different patterns;
music reproducing programmed logic circuitry that reproduces the music data corresponding to the enemy character appearing in the battle scene when the battle scene is displayed based at least in part on the difficulty levels;
operation detecting programmed logic circuitry that detects an input operation by the player;
changing value calculation programmed logic circuitry that calculates, in accordance with a degree of coincidence between the player operation input timing and the timing of said input pattern, a changing value by which a parameter of the enemy character is changed; and
parameter updating programmed logic circuitry that updates at least one parameter of the enemy character appearing in the battle scene according to the calculated changing value.

* * * * *